United States Patent [19]

Vertelney et al.

[11] Patent Number: 5,202,828
[45] Date of Patent: Apr. 13, 1993

[54] USER INTERFACE SYSTEM HAVING PROGRAMMABLE USER INTERFACE ELEMENTS

[75] Inventors: Laurie J. Vertelney, San Carlos; Thomas D. Erickson; S. Joy Mountford, both of Mountain View; John J. Thompson-Rohrlich, Palo Alto; Gitta B. Salomon, Palo Alto; Yin Y. Wong, Palo Alto; Daniel S. Venolia, Soquel; Kathleen M. Gomoll, San Francisco; Eric A. Hulteen, Los Gatos, all of Calif.

[73] Assignee: Apple Computer, Inc., Cupertino, Calif.

[21] Appl. No.: 700,729

[22] Filed: May 15, 1991

[51] Int. Cl.⁵ .................................. G06F 15/403
[52] U.S. Cl. ................................. 364/419; 395/159
[58] Field of Search ............... 364/419, 200 MS File, 364/900 MS File; 340/710; 395/145-149, 155, 161

[56] References Cited
U.S. PATENT DOCUMENTS 4,791,556  12/1988  Vilkaitis ............................ 364/200
4,931,783   6/1990  Atkinson ........................... 340/710

Primary Examiner—Roy N. Envall, Jr.
Assistant Examiner—Frant M. Poinvil
Attorney, Agent, or Firm—Timothy D. Casey

[57] ABSTRACT

A user interface element having a plurality of user interface elements for marking, finding, organizing, and processing data within documents stored in an associated computer system are described. Each element typically has an appearance which is uniquely related to the data or the function the element is designed to represent or perform, respectively. In their simplest form, these elements are only used to mark data within a document. Each element, however, can also be programmed to cause the computer to perform some function in association with the marked data, such as printing the data or mailing the data to someone. A user can select particular data within a document using an element and have that data associated with the element in memory. Data marked with common elements can be found by searching for a particular representative element in memory. Users can create their own elements, program elements with their own desired functionality, and modify existing elements. Elements can also be compounded together so as to cause a combination of tasks to be performed by simply activating one element.

20 Claims, 27 Drawing Sheets

USER INTERFACE SYSTEM HAVING PROGRAMMABLE USER INTERFACE ELEMENTS

FIELD OF THE INVENTION

The present invention relates generally to software techniques for marking, decorating and organizing data within a computer system, and more particularly, to a user interface system having a collection of different user interface elements, each having a unique identity and programmed functional characteristic that allows each element to be used to mark, find, organize and process data in documents within a computer system.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BRIEF DESCRIPTION OF PRIOR ART

A user interface is something which bridges the gap between a user who seeks to control a device and the software and/or hardware that actually controls that device. A user interface for a phone may be a set of keys. The user interface for a computer is typically a software program running on the computer's central processing unit (CPU) which responds to certain user-typed commands. As computers have increased in popularity and availability amongst less computer educated users, the quality of the user interface has become an ever more important consideration in the development of a computer, since many of these users are not familiar with and/or comfortable with many of the typed commands that are required to operate the computer. One popular type of user interface, which simplifies the operation of a computer, is available on Macintosh computers sold by Apple Computer, Inc., of Cupertino, Calif.

The Macintosh computer user interface employs what is referred to as a desktop metaphor for the basis of its user interface. Through use of a mouse or trackball in communication with the computer, the user can select and/or move certain iconic objects on the screen of the computer to control its operation. The desktop metaphor refers to the face that: (1) the screen of the Macintosh computer often looks somewhat like the blotter of a desktop, with a menu bar across the top of the blotter from which the user can select various control features; (2) there is a trash can icon in the lower right hand corner of the blotter which can be used to remove items from the computer; and (3) programs and documents created with the programs are represented by iconic images of pages which can be placed in iconic images of folders and arranged on the blotter for easy access and organization, like the files of a filling cabinet in an office. These icons can be arranged on the screen in a number of different manners, such as according to their type, size and color, and the user can search for files by searching for words listed in the title bar associated with each icon, but the user cannot search for a specific iconic image itself.

Another popular portion of the Macintosh user interface is the window feature. When a user selects an icon of a floppy disk or hard disk in a certain manner, a window (a rectangular shaped box which allows the user to "see" the information stored in the drive) appears on the screen of the computer. This window typically contains a number of folder, program and document icons and other images which represent the information stored in the drive. If a user selects a folder icon in a certain manner, the folder will "open" into another window representing the information within that folder. As previously stated, document and program icons can be placed in folder icons, but not vice versa, and no icon can be placed directly on a document.

Iconic images have become an important features of many user interfaces because they can be used to represent different types of data in a form which is readily understandable to the user. Icons, however, have had little functionality associated with them because they are typically only used to represent stored information that a user can access fairly directly, i.e., by selecting the icon. But some icon-like images have had some functionality associated with them, such as the button-like images that can be created with the HyperCard software application sold by Claris Corporation of Mountain View, Calif. The HyperCard application allows users to create card-like images that can have various images and features associated with them.

One of these features is the button, which can, to a limited extent, be created by the user and given a specific function defined by the user. Each button has an image and a small program or script associated with it which is run each time the button is selected by a user. These scripts can be written by the user using a special language called HyperTalk, which can only be used with the HyperCard program. Buttons are typically only used for mundane tasks, i.e., an image of an arrow may be used to cause the application to flip from one card to another card in response to the arrow being selected by the user. Some buttons are also used to perform some action which is associated with the informational content of the card on which the button appears, i.e., a button on a card displaying a number of musical notes may cause the computer to make sounds representing those notes when the button is selected. A button is limited to representing a task which is to be performed wile viewing an associated card in the HyperCard application, and not at some later point in time as directed by the user. For example, a user could not create a "To be printed" button and have the computer latter print every card which contained a "To be printed" button. In addition, buttons are not designed to be used to mark the cards or the data on the cards in any meaningful way to the user.

Another type of functional image is the "Post-it" note used in the FullWrite Professional word processing application by Ashton-Tate Corporation. By choosing the "note" option from the menu bar while writing a document, a small window can be created within which a small amount of text can be entered. When the user closes the window, the window is reduced to a small, generic, symbol which appears at the left-hand margin of the document. The position of the "note" symbol on the page is based on and corresponds to the position of an invisible command, which is entered into the text of the primary document when the user closes the note window. A "note" symbol cannot be moved to a different position along the left margin without moving the position of the invisible command in the text. "Note"

symbols can be given names and dates like icons to identify the creator of the note so that notes can be passed to different users and still maintain some level of identity. The name attached to each note, however, cannot be easily customized because the name is taken from the registration information used when the Full-Write application is run the first time. This name can be changed by selecting the "preferences" menu and typing a new name in, but this would not be a desirable manner in which to separately identify each note.

The HyperCard application also allows users to decorate various cards and other documents with special graphic images that can be cut from a card in the HyperCard application and pasted to a different card or a document in a different application. These images, however, are only fanciful bit-mapped designs which have no functionality associated with them. A similar concept is utilized in the KidsPix drawing application for children by Broderbund Software, Inc., of San Farael, Calif., which provides a palette of different colored "stamps" (bit-mapped graphic designs), which can be selected by a user and stamped (pasted) all over an open document to enhance a picture or drawing. When a stamp is a applied to a document, a noise is issued by the computer to help make the application more entertaining. The same noise is generated for each different stamp. In fact, noises are generally associated with every action performed in the KidsPix application, whether a stamp is selected or a line is drawn. The user cannot program the desired noise the stamp will make when utilized.

One final type of application image which is associated with the same type of function, is the macro program that is often attached to a spreadsheet cell (a bordered area within an electronic document). Spreadsheet applications, such as Microsoft's Excel application, allow the user to create rows and columns of cells within which information can be entered. Separate macro programs can be written to perform certain calculations using the spreadsheet's macro programming language and then associated with a cell so that a series of calculations will be performed and the result will be entered into the cell when that cell is selected. Neither icons, cells, stamps, buttons, nor other types of known graphic images can be used to mark, find, organize and process data in documents within a computer system.

SUMMARY OF THE INVENTION

A preferred embodiment of the present invention comprises a user interface system having a plurality of user interface elements for marking, finding, organizing, and processing data within documents stored in an associated computer system. Each element typically has an appearance which is uniquely related to the data or the function the element is designed to represent or perform, respectively. In their simplest form, these elements are only used to mark data within a document. Each element, however, can also be programmed to cause the computer to perform some function in association with the marked data, such as printing the data or mailing the data to someone. A user can select particular data within a document using an element and have that data associated with the element in memory. Data marked with common elements can be found by searching for a particular representative element in memory. Users can create their own elements, program elements with their own desired functionality, and modify existing elements. Elements can also be compounded together so as to cause a combination of tasks to be performed by simply activating one element.

BRIEF DESCRIPTION OF THE DRAWING

FIG. 7b illustrates the results of the find operation performed in accordance with FIG. 7a;

FIG. 8b illustrates the results of a list operation performed by one of the user interface elements illustrated in FIG. 8a;

FIG. 14b illustrates the operation of a cutter element as an alternative embodiment to the element maker illustrated in FIG. 14a;

FIG. 14c illustrates a modified version of the element maker dialog box of FIG. 14a;

FIG. 15c illustrates a compounded series of elements relating to the meeting element of FIG. 15a; and FIG. 15d illustrates the operation of a participants element.

DETAILED DESCRIPTION OF PREFERRED EMBODIMENT

Figure 1:
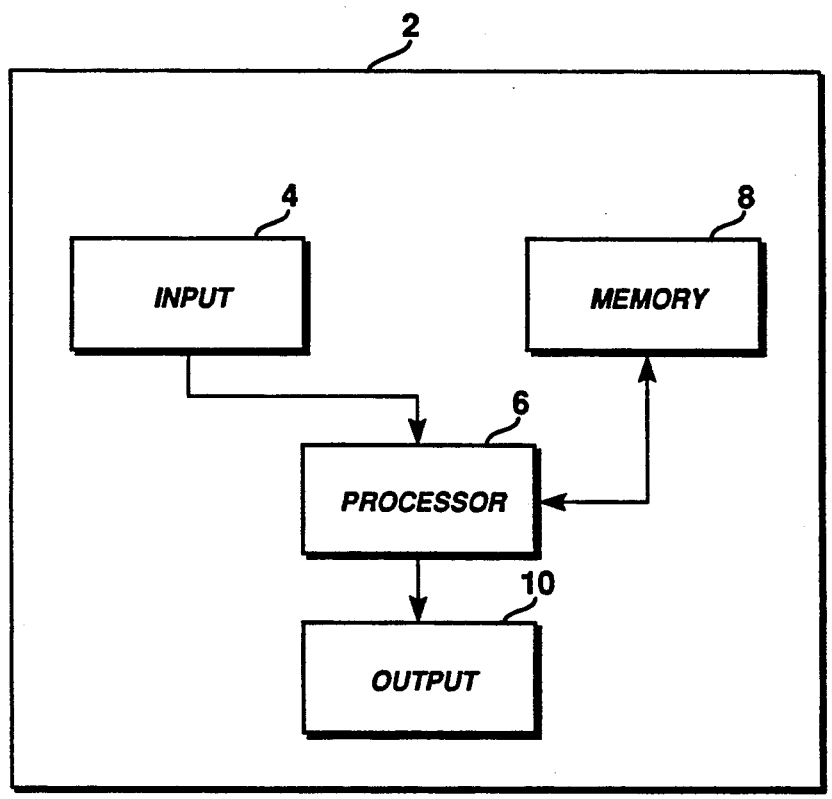
FIG. 1 is a block diagram of the function elements of a notebook computer for use in connection with the user interface elements of the preferred embodiment of the present invention.

A physically small computer, such as the notebook-sized computer 2 illustrated in FIG. 1, is highly dependent on its user interface for its general operation. In computer 2, the input 4 is generally only a touch or stylus sensitive panel through which the user can enter information, although the computer 2 may be adapted to receive additional information through different peripheral devices or through connection to a larger computer. The processor can range from being very small and simple to extremely powerful and complex. The memory 8 is generally as small as is reasonable for the types of applications to be operated and the amount of information to be stored in order to save space and power. The output 10 is usually just a display screen coupled to the input panel 4.

Although the user interface is an important part of any computer system, the user interface takes on special import in small computers, like computer 2, which have input device limitations that prohibit entry of text, such as through a keyboard or through handwriting recognition. Nevertheless, an interface, and elements thereof, which has been designed for a small computer can also be readily used in larger computing environments, ranging from standard desktop to mainframe computers, which do not have input device limitations. The user interface elements of the preferred embodiment of the present invention are accordingly intended for use in both types of computer systems, small and large, even though these interface elements are primarily described herein in terms of their application to smaller systems.

Figure 2:
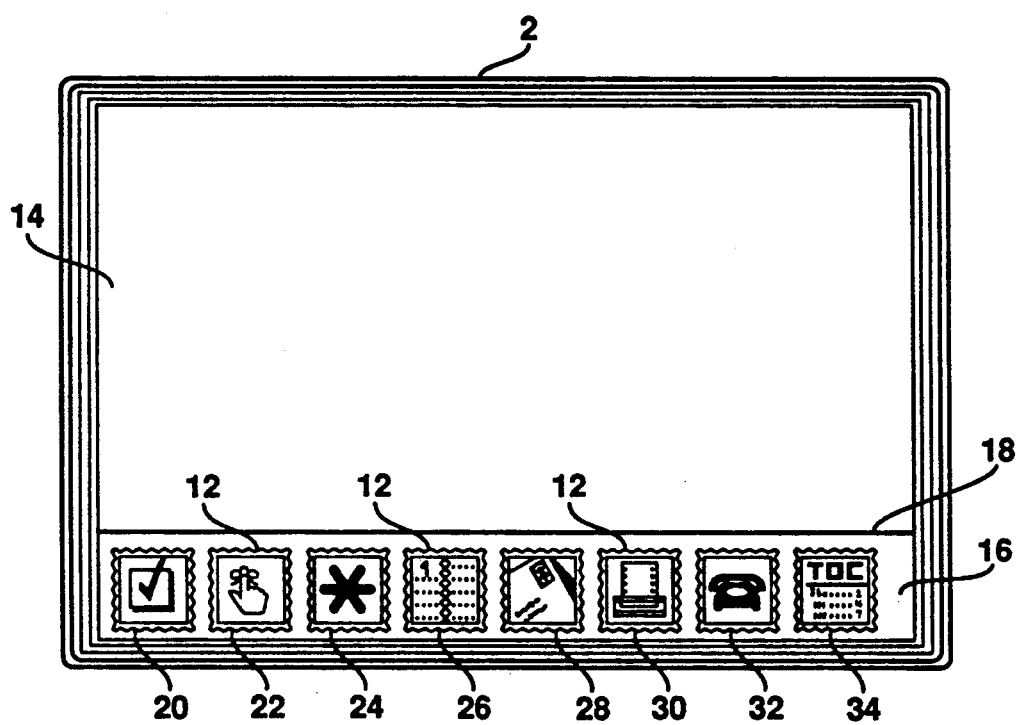
FIG. 2 is a top plan view of the notebook computer of FIG. 1 illustrating a collection of user interface element on the display screen of the computer in accordance with the preferred embodiment of the present invention.

In the preferred embodiment of the present invention, these user interface elements, shown generally in FIG. 2 as elements 12 on the display screen 14 of computer 2, have a fanciful stamp-like appearance. Although many other appearances could be utilized, some of which are illustrated with reference to FIG. 3, the stamp-like appearance is preferred because this appearance can be readily associated by the user to part of the operation of the interface elements. For example, since a user will have most likely previously used an ink stamp to mark a document or a postage stamp to mail a letter, the user should have little trouble understanding that elements 12 are to be applied to documents displayed on the display screen 14 of the computer 2. Like the desktop metaphor described with reference to the prior art previously described, the user interface elements of the preferred embodiment of the present invention create a stamp metaphor which enhances the intuitiveness of the individual user interface elements to the user. Once the user understands that elements 12 are to be applied to displayed documents in order to perform some function, the user can readily move on to understanding and utilizing that function.

A collection of these elements is shown in FIG. 2. In the preferred embodiment of the present invention, each element has a fanciful appearance and a programmed functional characteristic that allows that element to be used to mark, find, organize and process data within documents stored within the computer 2 in a manner which is unique to the appearance of that element. It should noted, however, that the association between the unique appearance of an element and its programmed function is not necessary, and that the elements need not have any appearance at all, i.e., aural representations could be used instead of visual representations to communicate the different types of elements to a user who may not be able to see the display screen 14.

In FIG. 1, a sectioned off portion of the display screen 14 is designated as an element well 16, within which a number of elements are displayed and made available to the user when the user is creating, viewing or editing any type of document or image displayed in the remaining portion of the display screen 14. The element well 16 could be enlarged by the user to display additional elements by selecting the well definition line 18 and pulling the line 18 up toward the top of the display screen 14, thereby revealing additional elements hidden below the level of the first line of elements 12 shown. Likewise, the user could hide all of the elements 12 by selecting and moving the well definition line 18 down to the bottom of the display screen 14, thereby freeing up additional screen space on the display screen 14.

Because the system described herein is that of a notebook computer with a touch-sensitive display, the act of selecting objects and moving them on the display screen is presumed to be performed with the user's finger. The same acts could, however, be performed with a stylus or pointing device, such as a mouse or trackball. In addition, whenever the user is described as selecting an object, such as well definition line 18, on the display throughout this specification, it is to be understood that the selection act could be performed in numerous different manners, such as touching the object once, or twice, or three times, or touching the object once and the performing some gesture command, or touching the object once and pulling down a menu from a header bar and selecting a command.

To implement an element well 16 on a present computer system, such as the Macintosh computer system produced by Apple Computer, Inc., the user need only create a display window, a technique which is well known in the art, which has had its appearance modified through use of a custom WDEF defProc. The function of this custom window would be modified in two ways: (1) the title bar would look and work differently so that only the well definition line 18 was visible; and (2) when the window size is changed, it changes the size of the window directly rather than as an outline of the window as is normally done on the Macintosh computer. For more information about creating and modifying windows and the appearance of other computer generated objects, which are well known in the art and need not be described here for an enabling disclosure of the present invention, see, Apple Computer, Inc., Inside Macintosh, Vols. I, II, III, and IV (1985), Addison-Wesley Publishing Company, Inc.

As described above, the appearance of each element is designed to impart some meaning about the particularly unique function of that element to the user. For example, with reference to FIG. 2, the To Do element 20 can be taken from the well 16 and applied to something on the display screen 14 that the user wants to remember to do herself, i.e., the handwritten sentence "Finish the application by Tuesday", or that the user wants the computer 10 to do at a later time, i.e., the handwritten instruction "Review my mail from today". Other elements, such as Remember element 22, Meeting element 24, Calendar element 26, Mail element 28, Print element 30, Phone element 32, and Table-of-Contents element 34, would likewise each have some special function which uniquely pertains to its particular appearance on the display screen 14.

Although the special functions of elements 22 through 34 will be explained in further detail below, it should be noted, however, that elements have a number of general functions which are common to all elements: (1) elements have a visible representation which enables them to serve as pictorial markers or labels; (2) elements may be applied to or associated with particular pieces of data; and (3) elements may be used as targets for a search. In addition, there are a number of functions which could be selectively applied to an element, such as: (1) elements could have and reflect states or actions; (2) elements could specify actions to be automatically done by the computer in the future; (3) elements could partially specify actions such that the user will have the choice, when either applying the element to a document or when the action is to be carried out, of completing the action specification at a later time; and (4) elements could be moved, reassociated with different objects, removed, and have their appearances and functions changed at any time, as desired by the user.

Figure 3:
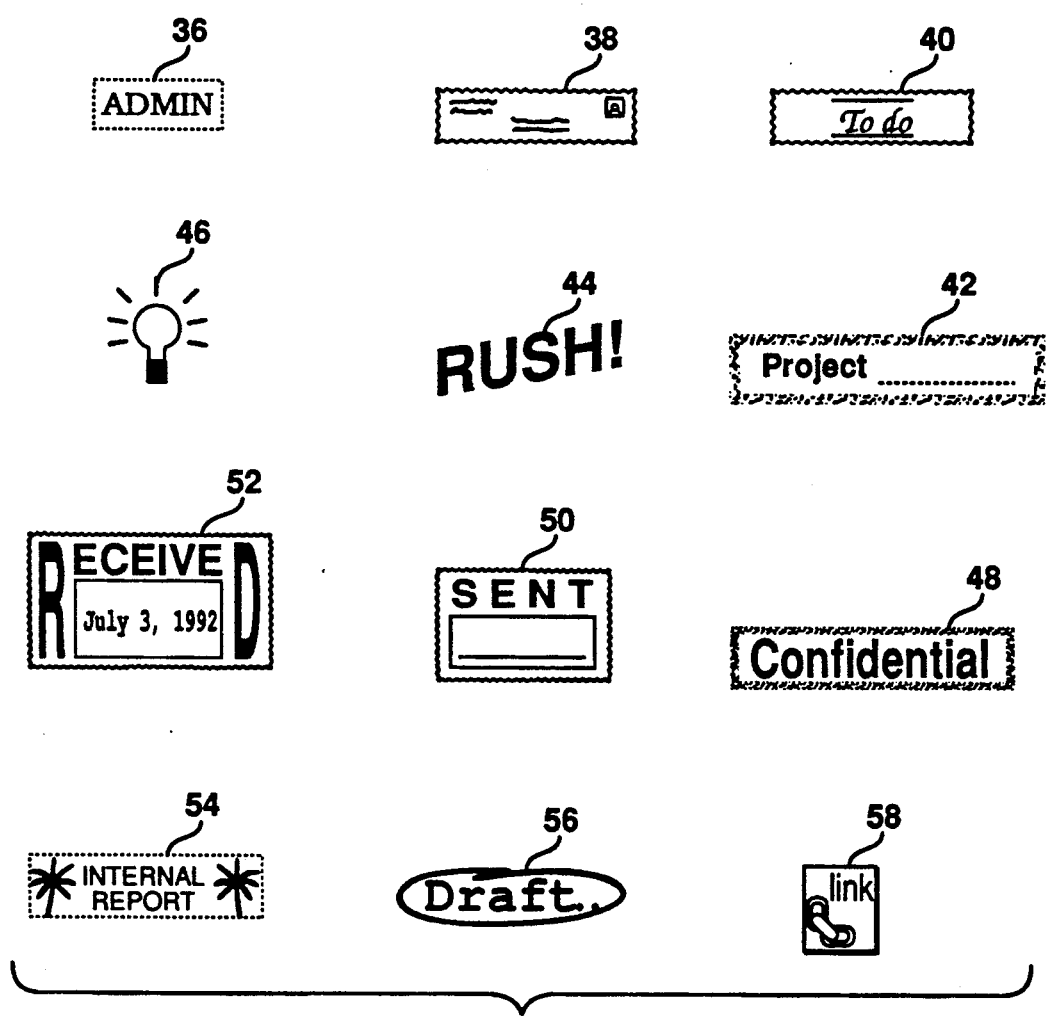
FIG. 3 illustrates a number of additional types of user interface elements, as they would appear on a display screen, in addition to those shown in FIG. 2.

As is illustrated in FIG. 3, the different types of elements and, in fact, the appearances of the same types of element, are unlimited. For example, an element could be very simple, both in terms of its appearance and its function, such as the Administration element 36, which could be a used to mark items which are to be distributed to only a limited group of administrative people on a computer network. Likewise, the appearance of the Mail element 38 could be used in place of the appearance of the Mail element 28, and the appearance of the To Do element 40 could be used in place of the appearance of the To Do element 20. Alternatively, the user could use different appearing elements, such as both Mail element 28 and Mail element 38, to designate similar but different types of functions. For example, Mail element 28 could be programmed to cause mail to be sent to one group of people, while Mail element 38 could be programmed to cause mail to be sent to a different group of people.

Although all of the user interface elements referred to so far are generically described as elements, it should be noted that an element actually is comprised of two different parts. One part is the element base and the other part is the element instance. The element base resides in the well 16. When it is selected by a user, the element instance is created as a bit-mapped duplicate of the element base. The element instance, not the base, can then be taken from the well 16 by the user and dropped on a page of the display screen. Alternatively, the element base could be moved from the well 16 after being selected by the user, and the element instance could be created when the element base is applied to a document. Once the instance is created, the base would return to its former position in the well. Many other techniques for using the bases and instances could also be readily developed.

Element bases could be presupplied with software installed on a computer 2 when purchased by the user, supplied with subsequently purchased software run on the computer 2, supplied by vendors who specialize in creating the elements 12, and even created by the user, as will be further explained below. Some of these element bases would be cloneable, meaning they could be duplicated and modified slightly to create a new element base. For example, Project element 42 could be originally supplied or created to only say "Project        ", and then be cloned by the user whenever desired to create a special element base, such as "Project Twin Peaks". In the same vein, an existing element base could be used as a template with which to create other element bases that look and act differently from the original.

With element bases being produced at a number of different sources, many uniquely pleasing and functional element bases and element instances could be created. For example, Project element 42 was designed to impart a leather-based, ink-stamped look, with its speckled rectangular boarder. Other interesting elements are the Rush element 44 and the Lightbulb element 46. The Rush element 44 could be singularly used to mark a computer generated document as a rush document, or it could be combined with another element, such as To Do element 40, to indicate that something that is to be done, is to be done immediately. The Lightbulb element 46 could likewise be used to decorate the appearance of a document, such as to indicate a good idea, or it could be used to indicate that something is to be remembered. It should be noted that within the context of the present invention, a "document" includes any electronically generated image for creating and editing data displayed therein, such as a page of text, a spreadsheet page, an electronic mail message screen, a video image or photo, and a folder of the type illustrated in FIG. 6c, but does not include a standard window within which typical iconic images are stored and organized, such as the program, folder and document icons mentioned in the discussion of the prior art above.

FIG. 3 also includes the Confidential element 48, which could be used to restrict access to documents. For example, when a document was marked with the confidential element, only users who entered a password would be able to read the document. Other examples of how the various elements of FIG. 3 could be utilized include: (1) documents marked with the Sent element 50 could cause the document to be automatically dated when sent to somebody; (2) documents marked with the Received element 52 could cause the document to be automatically dated when it was received by somebody; (3) documents marked with the Internal Report element 54 could be restricted to distribution only within a company or an office; (4) documents marked with the Draft element 56 would only print with the word "draft" written across each page; and (5) documents marked with the Link element 58 could be automatically linked to another document or another element located somewhere else in the memory of the computer 2.

An element instance, as briefly described above, is quite different from the element base from which its bit-mapped appearance is derived. Each element instance has one or more element attributes which help to identify the element instance to the system and which may be either system, element base, or user defined. Examples of system defined attributes are the name and type of the element instance and the date and time when the element instance was created. An example of an element base defined attribute is the message "Sent      " of element 50 depicted in FIG. 3 and the program which performs that function. Examples of user defined attributes would include the name "Priority" used to fill in the blank in "Sent      ", or a telephone number, a name, or even some notation. By using these element attributes, the computer 2 can store the element instances in a database in its memory, which can then be queries to find and retrieve the elements as desired. Another type of element attribute of a element instance can be its association with other data stored in the computer 2. As will be further described below, an element instance can be associated with either a whole page of a document or a particular features of a page displayed on the display screen 14. For example, an element instance could be associated with a piece of text in a mail message, or a scribbled phone number on a page.

Figure 9A:
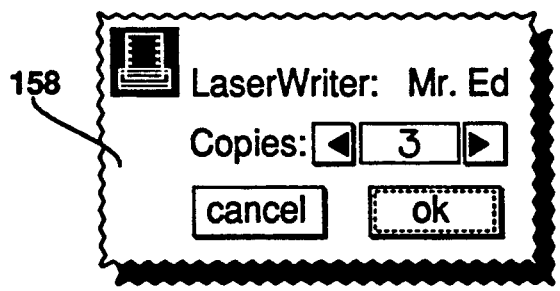
FIG. 9a illustrates the operation of a dialog box generated by activation of a print element.
Figure 9B:
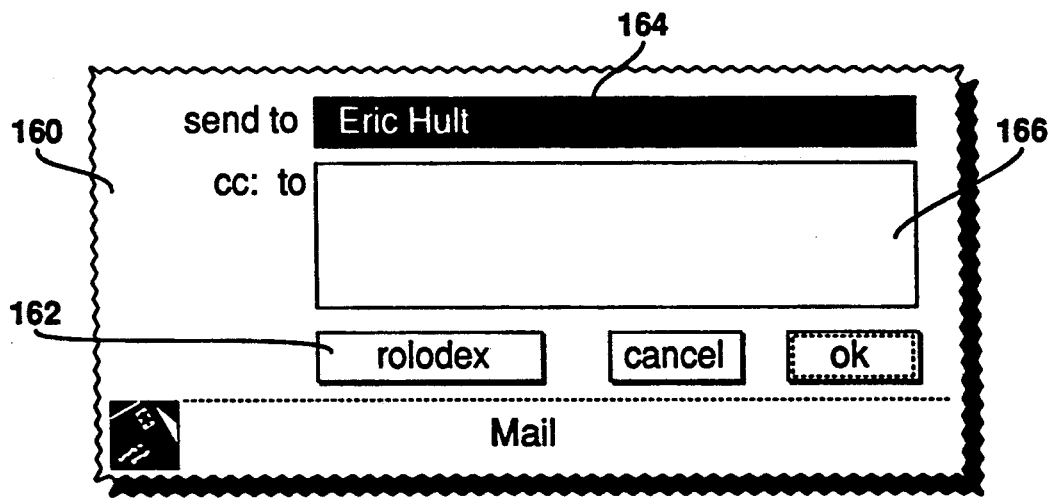
FIG. 9b illustrates the operation of a dialog box generated by activation of a mail element.

User defined element attributes are generally established through use of a dialog box or attribute sheet, which will be further explained below with reference to FIGS. 9a and FIGS. 9b. Each type of element could have its own dialog box which, if desired, would be particularly designed for use with that element. For example, the Phone element 32 could have a number of user definable attributes, such as the telephone number and the person's name. If the computer system with which the elements were being used did not have a keyboard or handwriting recognition capability, the dialog box for the Phone element 32 could be designed to include a keypad for entering numbers and names, or some other means for entering such data. Other element attributes for each type of element could also be developed as is appropriate for each type of element utilized in the computer 2. Additional features and element attributes of the various types of elements will be further explained below.

Figure 4A:
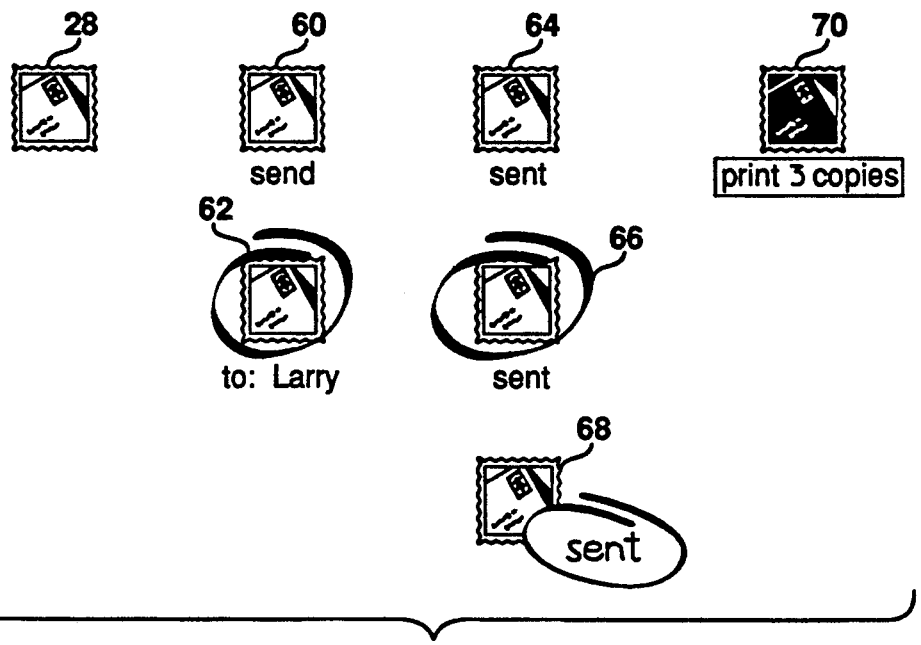
FIG. 4a illustrates the operation of a mail element and how this element would appear on a display screen during different levels of operation.

An additional feature of an element instance is that an instance can be modified internally by the computer 2, without disturbing any previously stored element attribute information, as the element passes through different levels of operation. FIG. 4a illustrates how Mail element 28 operates and how the appearance of the element instance for the Mail element 28 changes during its various levels of operation. When first pulled from the well 16 and marked on a document, the Mail element 28 appears the same as in FIG. 2. After the user has entered attribute information about the Mail instance, the appearance of the element instance may be modified accordingly. In addition, the Mail instance may change as the status of the operation which it is to perform changes. Mail element instance 60 has been modified to let the user know that the user has already commanded the document to which the instance 60 is attached to be sent to someone. Mail element instance 62 performs the same function, but also includes element attribute information about who will be mailed the document. After the document has been sent, the element instance could again be modified to indicate that the document has been sent as commanded through use of Mail element instance 64, instance 66, or instance 68. Element instances could also be modified to indicate other functions or operations of the element. For example, if the dialog box for Mail element 28 included a print element attribute and allowed the user to specify the number of printed copies, Mail element instance 70 might be displayed on display screen 14. Likewise, Mail element 28 could be combined with Print element 30, as will be explained below, so that attributes of the Print element 30 carried over the Mail element 28, resulting in the creation of Mail element instance 70.

Figure 4B:
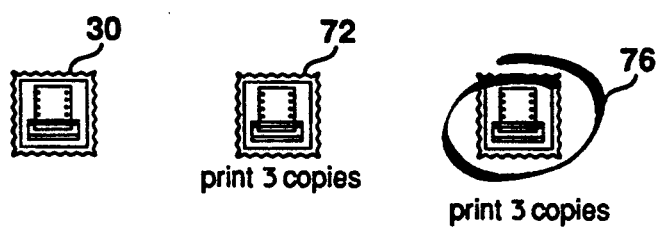
FIG. 4b illustrates the operation of the print element and how this element would appear on a display screen during different levels of operation.
Figure 4B:
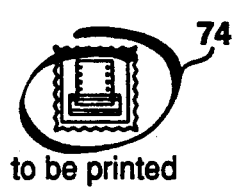

FIG. 4b similarly illustrates how Print element 30 operates and how the appearance of the element instance for the Print element 30 changes during its various levels of operation. For example, after the user has entered attribute information about the Print instance, the appearance of the element instance would be modified to reflect this information. If a user indicates that she desires to print three copies of the document, Print element instance 72 might be created. Alternatively, the modification could simply reflect that the document is to be printed, as is illustrated by Print element instance 74, rather than include information in the element instance about the number of copies to be printed. After the document has been printed, the Print element 30 could be modified like Print element instance 76, to indicate that the document, and perhaps a certain number of copies, had been printed.

Figure 5A:
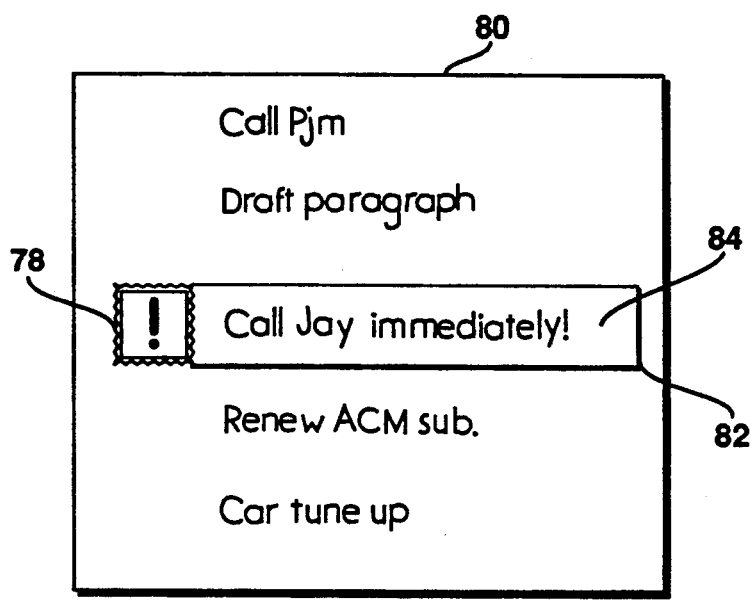
FIG. 5a and 5b illustrate two different techniques for attaching data on a display screen to a user interface element for subsequent processing.
Figure 5B:
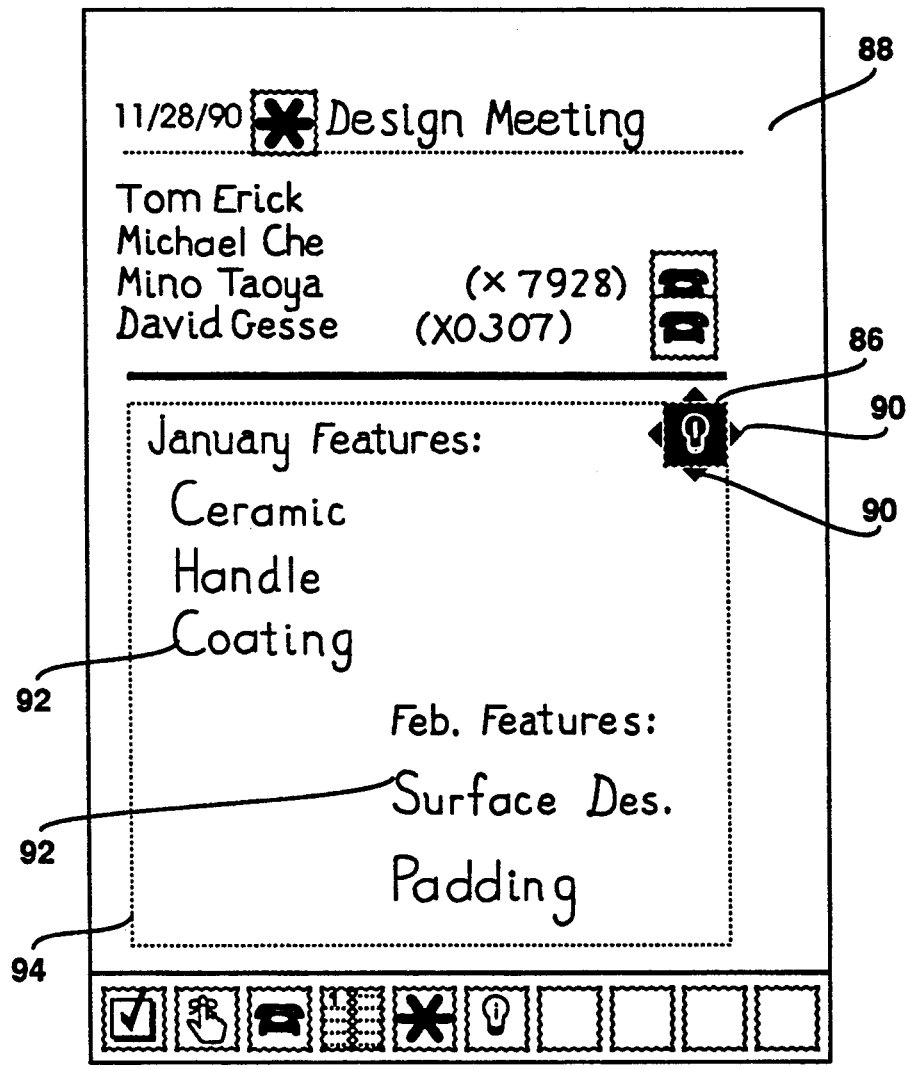

As previously discussed, the ability to associate data stored in the computer 2 with an element instance is an important element attribute of many elements. FIGS. 5a and 5b illustrate two different techniques for attaching data on a display screen to an element. A first technique is illustrated in FIG. 5a. Element instance, such as Notice element instance 78, is removed from the well 16 and marked on the document 80, which consists of a number of handwritten notes, and then dragged across the document 80 in such a manner that the data to be associated with the element instance is enclosed by a framing box 82 issued from instance 78. The action of enclosing data within a framing box 82 to select that data on a display screen 14 is essentially the same action which is performed by selection tools of many publicly available drawing and painting software programs. In FIG. 5a, the user has attached the note "call Joy immediately!" 84 to the Notice element instance 78, by placing instance 78 behind the word "immediately!" and then dragging instance 78 across note 84 to the front of the word "call". Had the user also wanted to enclose the notes above note 84, the user could have simply continued to drag instance 78 to the top of the document 80, thereby enclosing the additional data. When the user had enclosed all of the desired data, the user would release instance 84, which would in turn cause framing box 82 to disappear and cause instance 78 to stay at its last position on document 80. Although framing box 82 would disappear once instance 78 had been released, an element attribute defining the enclosed data would be entered in the database of computer 2 so that the attached data could be found and displayed when collected through use of the proper query at a later time.

FIG. 5b illustrates a second technique or associating data in a document with an element instance. In this technique, when Lightbulb element instance 86, the appearance of which is inversed to indicate that it is in its association mode, is marked on document 88, a set of pointers 90 appear, one on each side and one on each corner of instance 86, which indicate the direction instance 86 can be moved to enclose data. If instance 86 had been marked in the bottom left-hand corner of document 88, and then moved up and over to the right of document 88, it would end up where presently located on document 88, and enclose the notes 92 in framing box 94. Releasing instance 86 from its association mode would then cause the pointers 90 and framing box 94 to disappear from document 88, and instance 86 to revert to its standard appearance, a black element and lightbulb outline with a white background.

Figure 6A:
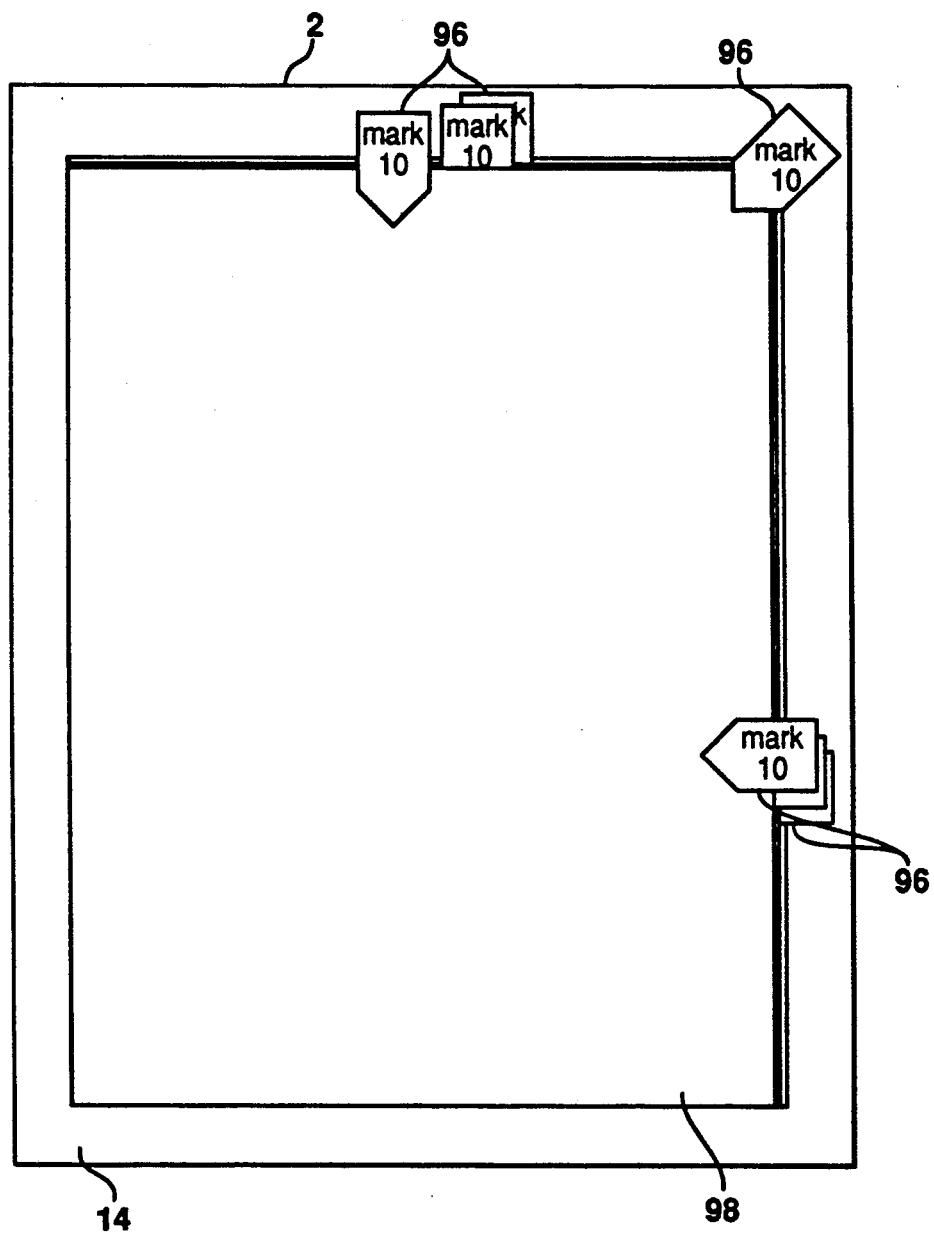
FIG. 6a illustrates a technique for marking a page of data on a display screen with one or more user interface elements.
Figure 6B:
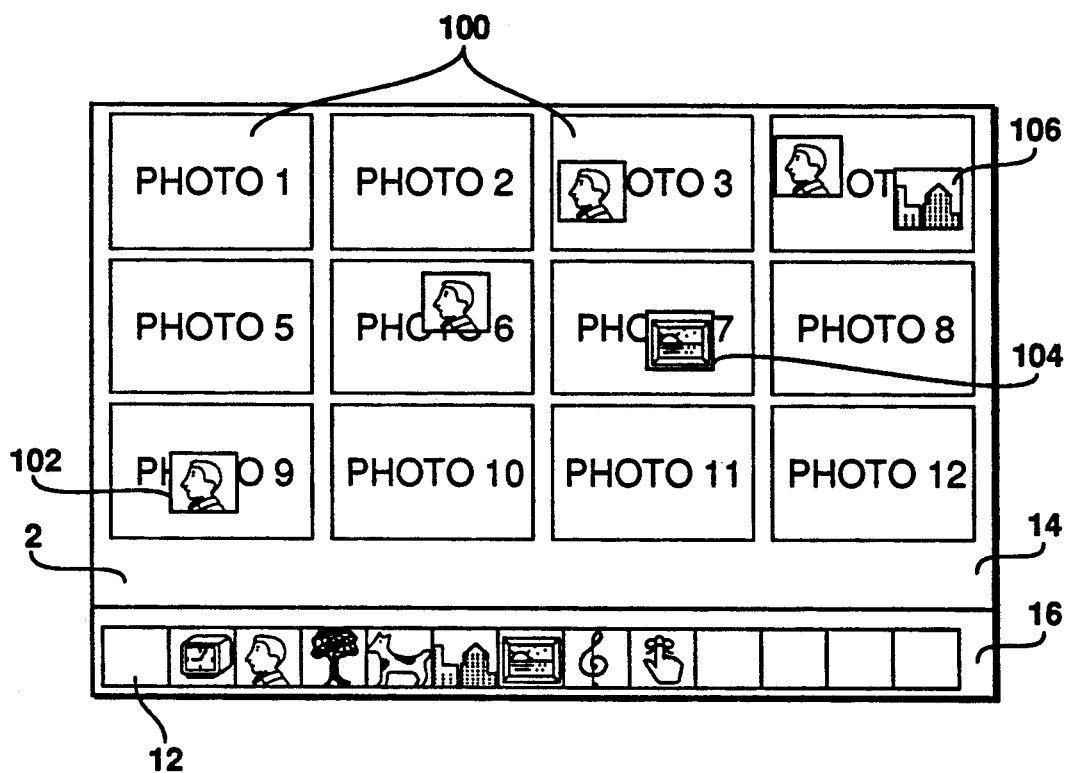
FIG. 6b illustrates a technique for marking portions of data on a display screen with one or more user interface elements.
Figure 6C:
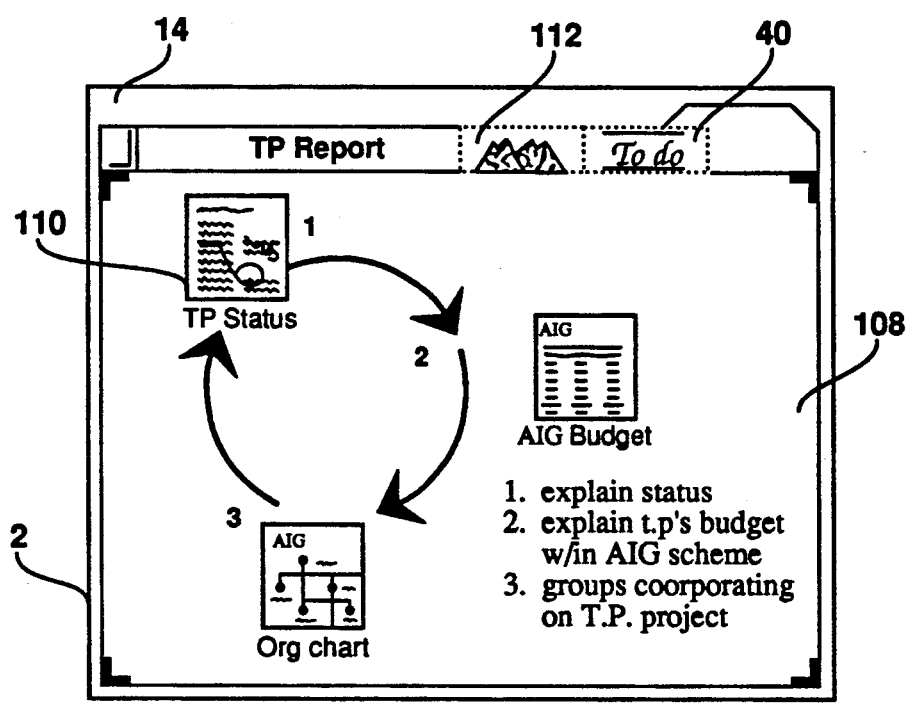
FIG. 6c illustrates a technique for labeling a folder of data on a display screen with one or more user interface elements.

Element instances can also be associated with entire pages of data in a computer, as is illustrated in FIG. 6a, distinguishable portions of data on a page of data, as is illustrated in FIG. 6b, or folders containing multiple pages of data and other types of information, as is illustrated in FIG. 6c. FIG. 6a illustrates a technique whereby different pages of data on display screen 14 are marked with elements, thereby associating each page with any element marking that page. Mark element instances 96 could be placed at any position desired on page 98, but would preferably be placed on page 98 so that they would still be somewhat visible if page 98 was covered by another page at a later time, as is demonstrated by the other visible portions of Mark element instance 96 on pages behind page 98. As shown in FIG. 6a, all of the Mark element instances 96 have identical element attributes, they are all numbered "10", but could also be assigned different numbers, as desired by the user, to further distinguish each element instance.

In FIG. 6b, the computer 2 is being utilized to run a software program which allows the user to view a number of photographs 100 labeled Photo 1 through Photo 12 pictured on display screen 14. In this scenario, the user would like to mark certain photographs 100 with different elements 12 from the element well 16 in order to remember certain things about each photograph and to aid the user in later sorting through the photographs 100. Since the software program which displays the photographs 100 is capable of distinguishing between the various photographs and the display screen space occupied by each of the photographs, the user need only mark a photograph with an instance to mark the photograph and thereby associate the information in the photograph with the element used to mark it. For example, photographs 100 labeled Photo 3, Photo 4, Photo 6 and Photo 9 all contain pictures of people the user wants to remember, so the user marks each of these photographs with the Participants element instance 102. Photo 7 contains information about the user's recent trip to Japan, so it is marked with the Rising Sun element instance 104. Photo 4 also contains information about a city the user visited while in Japan, so it is marked with the City element 106.

FIG. 6c illustrates that element instances can be used to mark folders of data on a display screen. Computer 2 has an image of a folder 108 displayed within display screen 14. Folder 108 could both display data, such as the notes 110 pictured on the front of folder 108, and act as a storage for other information which relates to the marks associated with the folder 108. In FIG. 6c, folder 108 is marked with two element instances, the Twin Peaks element instance 112, which relates to the project the user is working on, and the To Do element instance 40, which indicates that certain documents within the folder 108 are marked with the To Do element instance 40. This feature of marking folders with element instances is useful because by simply marking a folder with an element instance, such as Twin Peaks instance 112, all of the documents containing the Twin Peaks instance 112 would be collected within folder 108.

Figure 7A:
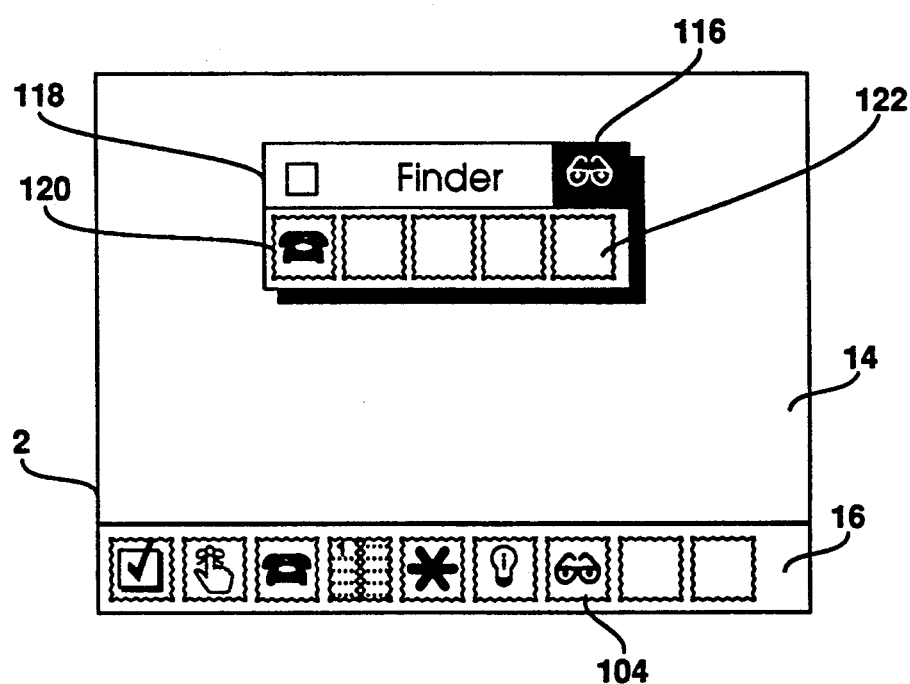
FIG. 7a illustrates a technique for finding user interface elements in a computer system.

As described above, the various attributes of an element can be used to find data stored in the computer 2. One technique for querying the element database of computer 2, is shown in FIG. 7a, which illustrates a folder tool for filtering through stored instances to find data that matches the query constructed by the user. By selecting the Find element 114 in the well 16 of display screen 14 and moving an instance 116 of element 114 into the display screen, the user causes a finder tool box 118 to be opened on the display screen. To find particular data, the user need only select an instance of that element from the well 16, such as Phone element instance 120, and drop the instance into one of the query boxes 122 of the finder tool box 118. The processor 6 of computer 2 would then proceed to filter through the database in its memory 8 until it had found all of the documents or pages containing the Phone instance 120, which acts as a proxy to the data stored in memory 8.

Figure 7B:
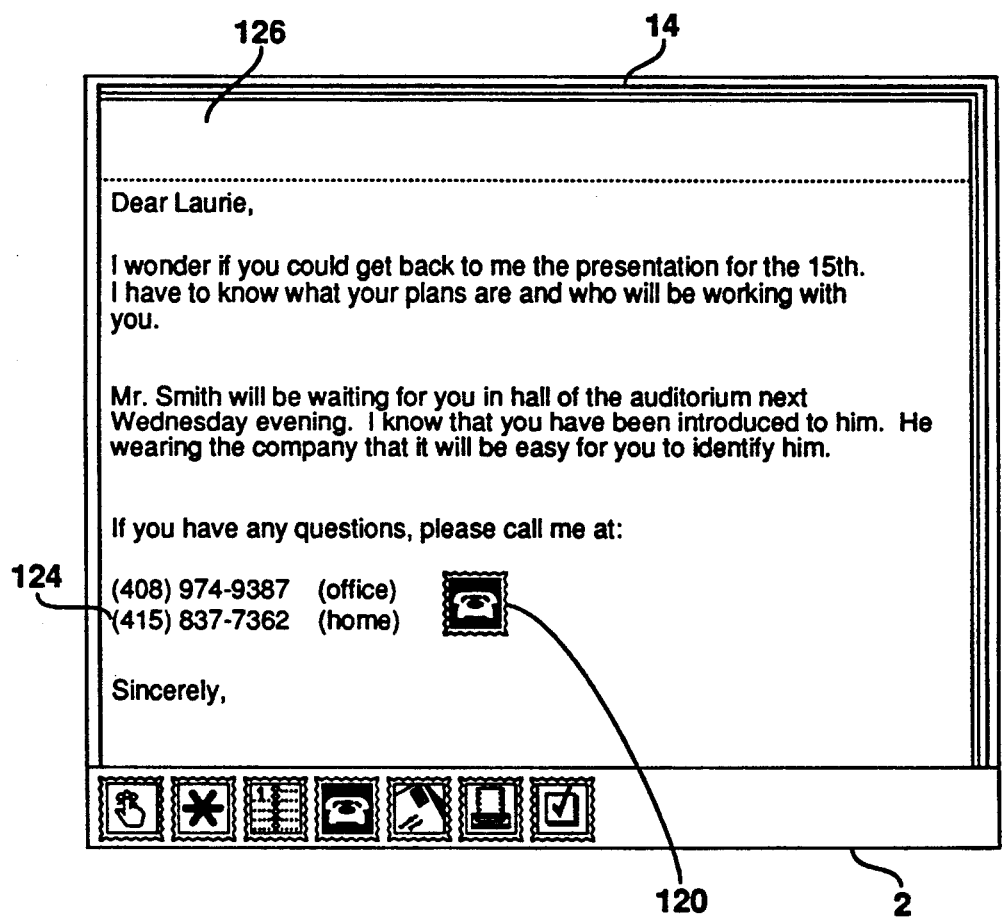

Depending on how the Phone instance was utilized, the user would then be shown a collection of documents or pages containing the queries element and data from documents that had been previously associated with that element. For example, FIG. 7b illustrates the results of the find operation performed in accordance with FIG. 7a, wherein a number of pages were found to contain the queried Phone element instance 120. In addition, the user has associated certain notes 124 on a number of the pages, such as page 126, so notes 124 are highlighted by the computer 2 to indicate that they are associated to Phone instance 120. In FIG. 7b, material which was not associated with Phone instance 120 is greyed-out, for example by removing alternating lines of pixels from the display screen 14, thereby causing the associated material to visually stand out to the user. Had the user not associated any particular data with the instance, the entire page, without any section highlighted, would have been displayed.

More sophisticated filter queries could also be performed by computer 2 if additional features were added to finder tool box 118, such as a term search section. The performance of this feature, however, would be highly dependent on whether the user had the ability to enter recognized text. If the computer 2 is capable of having text characters entered, such as through a keyboard, then the computer could easily search for matching sets of text characters within the data associated to each queried element. If the user could not enter text in this fashion, the user may still be able to copy text from the display screen 14 and paste the copied text into the term search section. Of course, this would only work if the text being searched for exactly matched the text stored in the term search section. In addition, it should also be noted that the user could perform hierarchical searches through use of the finder tool box 118 illustrated in FIG. 7a by simply placing additional element instances in the remaining query boxes 122. Hence, the computer 2 would first filter through all of the data to locate data associated with Phone element instance 120, and then filter through that data to find data associated with the next element instance, etc., until all of the queried boxes 122 had been processed.

Figure 8A:
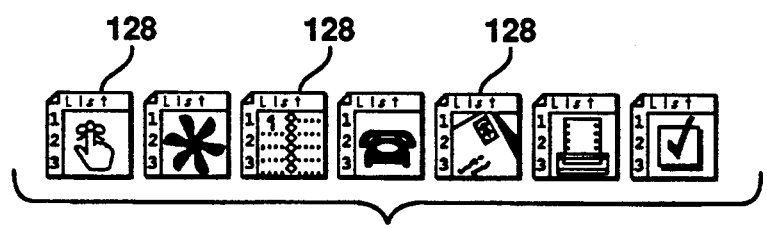
FIG. 8a illustrates a series of user interface elements which can be used to create lists of associated elements without performing a find operation.
Figure 8B:
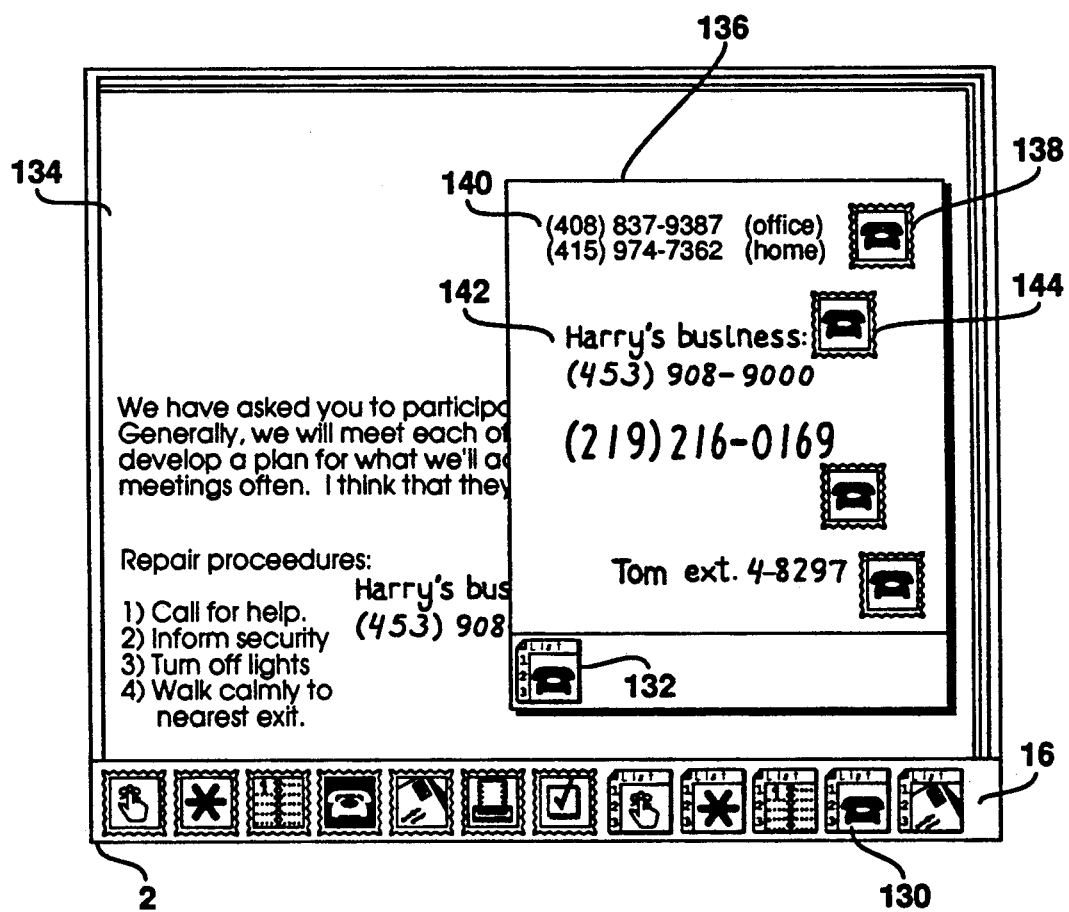

Another technique for collecting element instances is shown in FIG. 8a, which illustrates a series of list elements 128 which can be used to create lists of elements with common attributes without performing a find operation. List elements give the user a simply means of viewing all of a particular type of element stored in the database and also provides the user with an opportunity to go directly to the page that is marked with one of the elements listed, as will be described below. As shown in FIG. 8b, when the user selected the List Phone element 130 from well 16 of the display screen of computer 2 and moved its instance 132 onto page 13, a list 136 of phone element instances, such as instance 138, and the instances associated notes, such as note 140, was created. If the user then selected one of the listed notes, such as note 142, consisting of the handwritten message "Harry's business (453) 908-9000", the computer 2 would then automatically proceed to display the page 134 on which the selected note 142 and instance 144 appeared.

Figure 8C:
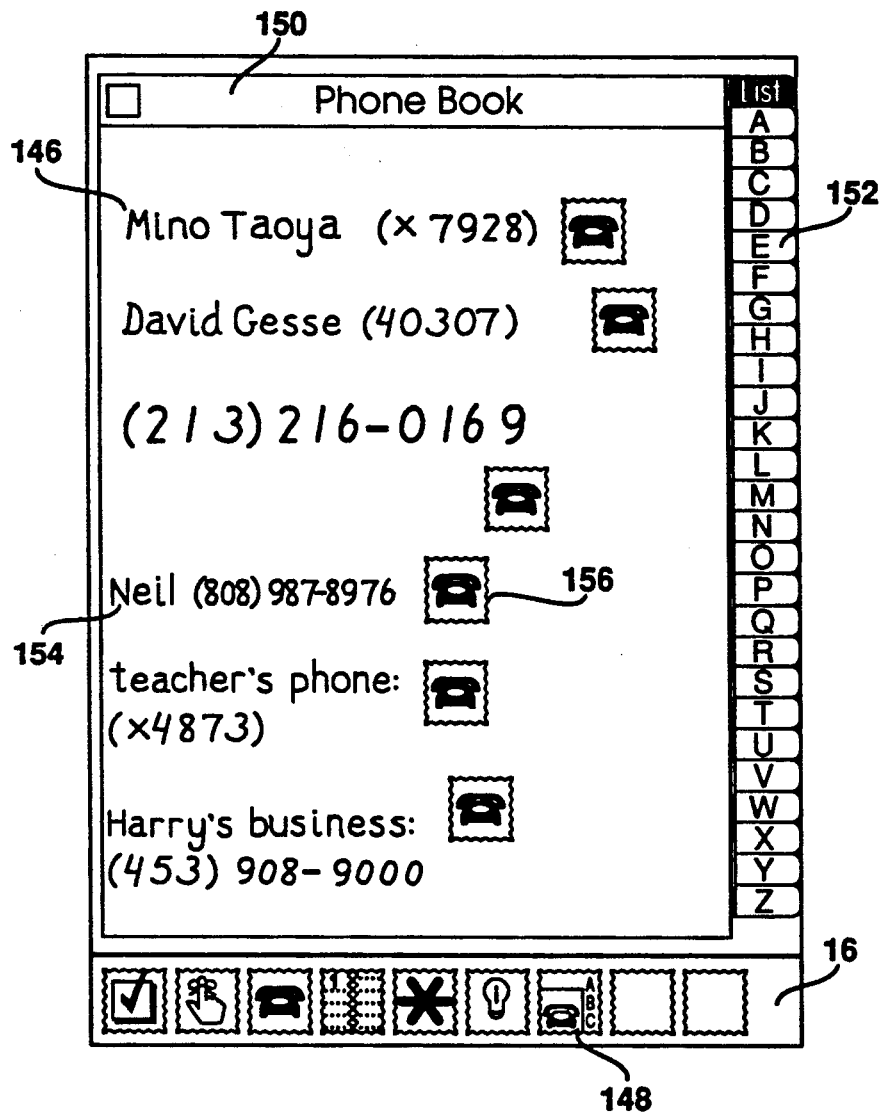
FIG. 8c illustrates a technique for cataloging a list of user interface elements and their attached data.

Since the list 136 of FIG. 8b are not listed in any particular order, such as alphabetically, as might be possible with a computer that was capable of receiving text, some means of cataloging the notes from list 136 should be provided. FIG. 8c illustrates one such technique for cataloging a list of elements and their attached data. After creating a list 146 of instances and associated notes, the user would select the Phone Book element 148 from the well 16 and drag its instance onto the list 146. The computer 2 would then know to change the appearance of the list 146 so that the Phone Book header 150 appeared at the top of the list 146 and the alphabet catalog 152 appeared at the right of the list 146. To alphabetize the list using the Phone Book that has now been created, the user need only select and drag a note and the attached instance, such as note 154 ("Neil (808) 987-8976") and instance 156, and drop it onto the appropriate letter, in this case the letter "n", of the alphabet catalog 152. The computer 2 would proceed to take note 154 and instance 156 and place them on a new list with any other notes and instances that had previously been placed into the letter "n". After placing the notes and instances into the appropriate letters, the user could access the notes stored under a particular letter by selecting that letter from the alphabet catalog 152.

As specified above, elements are noted as having two basically different parts, the element base and the element instance, one of which, the instance is derived from the other, the base. But elements can also be specified as having two different functional characteristics as well, the active element and the passive element. Passive elements are generally only used to mark and associate data and to locate that marked or associated data at a later time, although some passive can also be used to perform very specific functions which require no user interaction to perform. Active elements have scripts or actions (programmed functions) associated with them, which may be as simple as "open dialog box when instance is created" or as complex as "perform these actions when the computer is re-connected . . . "

Active elements typically open their dialog box or attribute sheet immediately upon the creation of the element instance. An example of an active element is the Print element 30. When the user marks a page to be printed with an instance of the Print element 30, the attribute sheet, in this case the print dialog box 158 of FIG. 9a, appears on the page as well. The user then interacts with the dialog box 158, such as by specifying the printer that will print the marked page, setting the number of copies to be printed, and determining whether to approve the attributes or to cancel the dialog box 158.

Mail element 28 is also an active element. When an instance of Mail element 28 is marked on a page, mail dialog box 160 of FIG. 9b also appears on the page. The user can interact with this dialog box to determine whom the page will be sent to and to whom it will be carbon-copied ("cc"). Since the user may not be able to write down the names of the addressees and have the computer understand what has been written, a number of precoded names and address information would be made available to the user through selection of the rolodex button 162. Selection of rolodex button 162 would cause a list of possible names to appear from which the user could chose, thereby causing the chosen name to appear in either the sent to box 164 or the cc: to box 166, depending on which box was selected at the time the user selected the rolodex box 162.

Figure 10A:
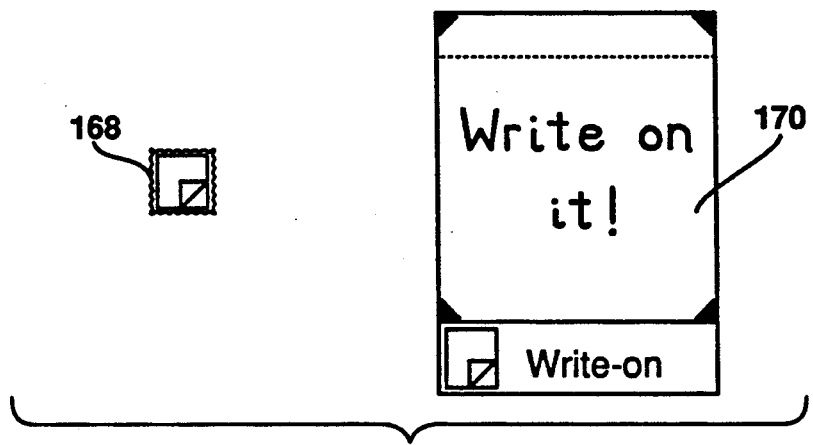
FIG. 10a illustrates the operation of a write-on it element and a dialog box generated by activation of the write-on it element.

Another type of active element is the write-on element 168 of FIG. 10a. When a user marks an instance of write-on it element 168 on a page, write-on it dialog box 170 appears on the page. The user can then scale the write-on it dialog box 170 to any size and write whatever note within the dialog box 170 that the user desires. Write-on it dialog box 170 can also be moved to any position on the page and can be left open by the user so that it can act as an extra writing area of the page, just like a 3M Corporation Post-It TM note can be attached to a piece of paper.

Figure 10B:
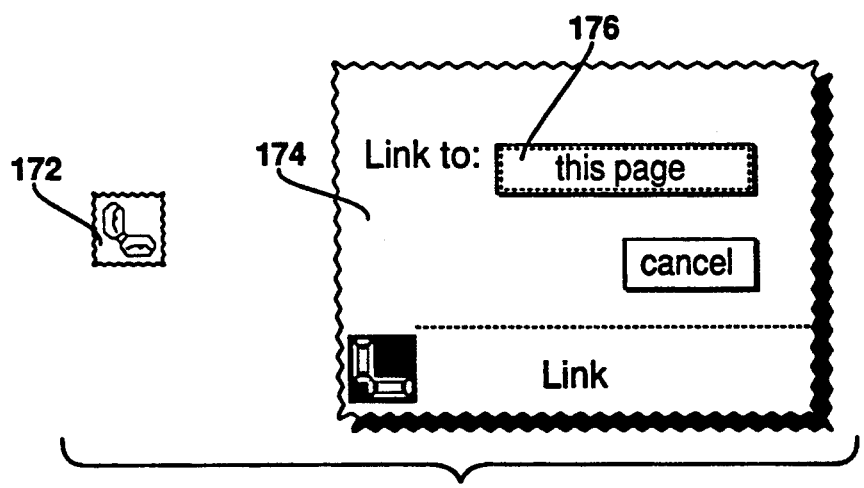
FIG. 10b illustrates the operation of a link element and a dialog box generated by activation of the link element.

Link element 172 of FIG. 10b, which is the functionally the same as link element 58 of FIG. 2, only different in appearance, is also an active element. When an instance of link element 172 is marked on a page, link dialog box 174 appears. Link dialog box 174 will then stay visible on the display screen 14 while the user pages through the various pages of information stored in computer 2. When a desired page is located, the user then selects the "this page" button 176 causing an instance of the link element 174 to be marked on the desired page and causing the computer 2 bounce back and display the original page on which the instance of the link element 172 was originally attached. To jump between the linked pages in the future, the user would only need to select the instance of the link element 172.

Figure 11:
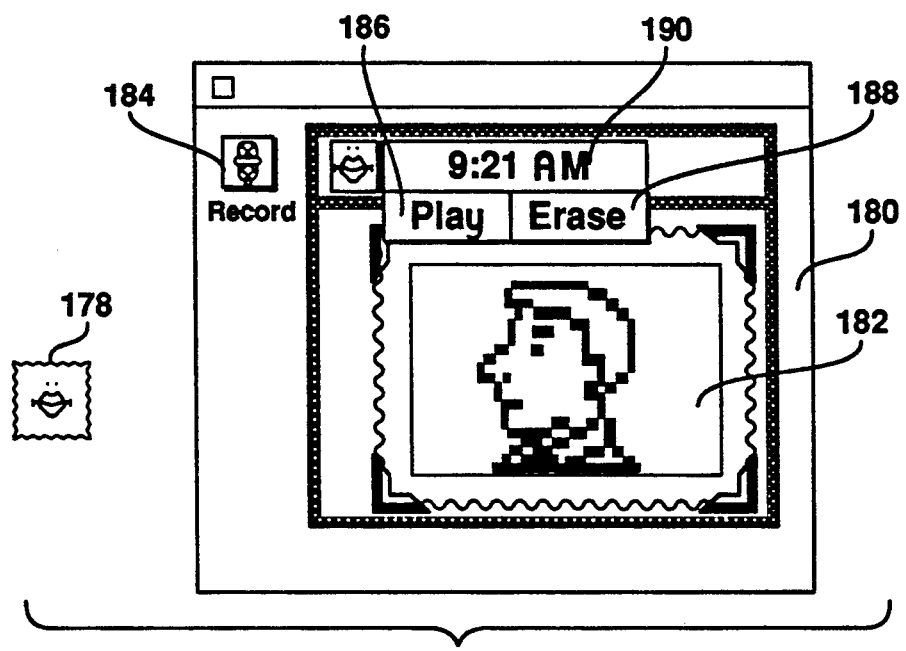
FIG. 11 illustrates the operation of a dialog box generated by activation of a sound element.

A more complicated active element is that of sound element 178 of FIG. 11. This element would typically be used to mark and associate a photograph or some other image with an instance of the element and then also associate sound to that photograph of image through use of the sound dialog box 180. For example, if the user associated the picture 182 to an instance of sound element 178, at least a portion of picture 182 would appear within frame 184 of sound dialog box 180. The user could then use the record button 184 to activate a recorder of the computer 2, which the user could speak into or record some other sound with for storage in memory 8, until the recorder button 184 was again selected or a maximum amount of record time had passed. The user could then playback the recorded sound by selecting play button 186 or erase the sound by selecting erase button 188. The time header 190 would indicate when the sound was recorded. After the sound had been recorded, the user could playback the sound without accessing the dialog box 180 by simply selecting the instance of the sound element 178 attached to the original picture 182. Of course, dialog box 180 could be reaccessed at anytime by selecting the instance of the sound element 178 in a different manner.

Figures 12A, 12B:
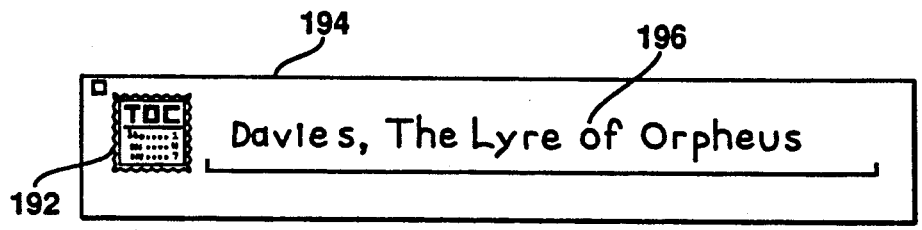
FIG. 12a illustrates the operation of a table-of-contents element and a dialog box generated by activation of the table-of-contents element.
FIG. 12b illustrates the results of a table-of-contents list operation as performed by a table-of-contents list element.

When instance of the table-of-contents element 192 of FIG. 12a is marked on a page, it causes the computer 2 to open the table box 194, within which the user can write a title or other note 196 concerning the information stored on the marked page. The note 196 is then associated with the instance, along with information about the page number of the page marked with the instance, and stored in memory 8. After marking numerous instances of table-of-contents element 192 on different pages of the same document or within a notebook of the computer 2, marking the instance for the list element version of Table-of-contents element 192 on a page will cause the table-of-contents list 198 to be displayed. List 198 includes each of the notes 200 that the user previously entered in each table box 194, as well as the corresponding page number that was associated by the computer 2 after entering a note 200.

Having previously explained the basic principal features and operation of the various types of elements, FIGS. 13a through 13d go on to further illustrate, in general terms, how these elements operate within a computer system, such as computer 2 of FIG. 1. It should be noted that the process described in the flow chart of FIGS. 13a through 13d is only a small portion of a user interface system, and has been greatly generalized to reduce the level of confusion that would otherwise by caused by attempting to explain the detailed operation of every possible type of element in this flow chart. However, since many of the various possible types of elements have been described in detail with reference to the above figures, there should be nothing enabling missing from the disclosure made herein. It should also be noted that the images of the various elements, dialog boxes and other features of the user interface elements of the present invention, in addition to the software program needed to perform the process described in FIGS. 13a through 13d, as well as the details of the various processes described elsewhere in this specification, could be readily created by a person of ordinary skill in the art using a version of the C programming language, such as C++. In addition, many of the software programmed functions described herein could also be performed in hardware using specialized hardware integrated circuit devices, such as an ASIC.

Figure 13A:
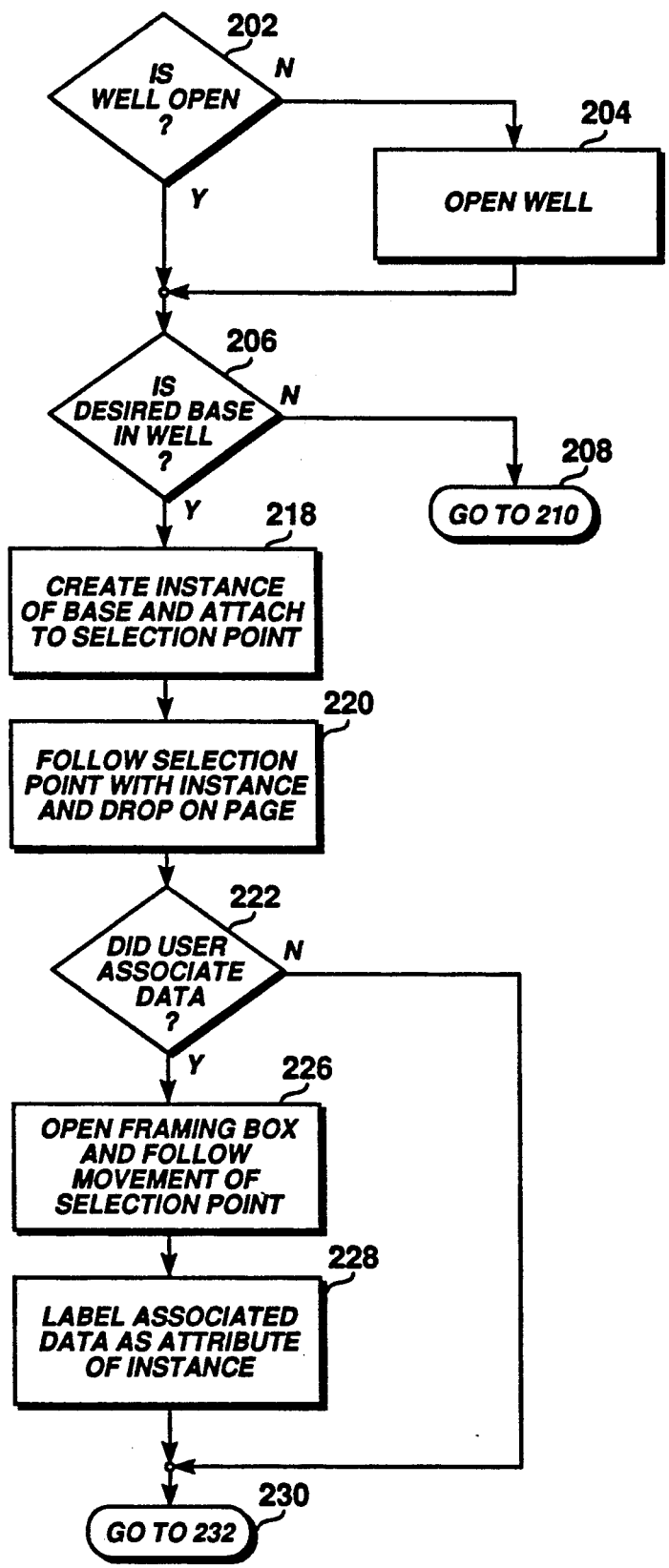
FIGS. 13a through 13d are flow charts illustrating the operation of the user interface elements of the preferred embodiment of the present invention.

Now, with respect to FIG. 13a, the process starts by looking to see if the element well 16 had already been opened as a result of a prior operation, block 202. If the well 16 had not been opened, it would be opened in block 204. In a notebook type computer with a touch sensitive display panel, the user would probably open the well by selecting the well definition line 18 and moving the line 18 upward until the desired or maximum height for the well 16 had been achieved.

Once the well 16 had been opened, the user would then search through the content of the well in search of the desired element base required to perform the desired function of the user, block 206. If the desired element base was not in the well, the user would go on, block 208, to either clone an existing base, block 210 of FIG. 13b, or create a new base using an element base maker tool, block 212. The operation of the element base maker tool is further explained below with reference to FIG. 14. If a base could be cloned, the user would proceed to make a clone of the base, for example by first selecting a base to clone and then selecting a clone command from a menu of available operations. The user would then proceed to modify the clone by adding any desired attributes, and perhaps changing the base's appearance as well, block 214. Regardless of how the new base is created, once it was created, it would then be placed in the well 16 by the computer 2 so that it could be utilized to create instances, blocks 212 and 214. The system would then return, block 216, to the flow chart illustrated in FIG. 13a to create an instance of the selected element base, block 218.

After creating the instance of the selected base in block 218, the computer 2 would then attach the instance to the selection point created by the user, for example by pressing a finger against the display screen 14. The instance would then follow the selection point created by the user out of the well 16 and drop-off (affix or mark) onto the page when the selection point was removed, block 220. Upon being marked on the page, the computer 2 would store identifying information about the instance in the element instance database of memory 8. If the user then selected the dropped off instance and selected the association command, block 222, from the menu of available operations, the user could then enclose associated data with a framing box, such as framing box 82 or framing box 94, block 224. The associated data would be labeled as an attribute of the instance and stored in the element instance database, block 226. At this point, or in the event that the user chose not to associate data with the instance, block 230, the computer 2 would proceed to see if the selected instance was active, block 232 of FIG. 13c.

If the selected instance was active, the computer 2 would open a dialog box on display screen 14, block 234, within which the user could enter various attributes. If the user does not okay these attributes, block 236, the dialog box is canceled, erased from the display screen, as are the attributes that the user may have just entered, block 238. On the other hand, if the selected instance was passive, or the user okayed the attributes entered in block 234, the authorized attributes, along with any system defined or element base defined attributes, are stored in the database of memory 8, block 240. After storing the instance attributes, the computer 2 looks to determine if the programmed function of the instance is immediate or delayed, block 242. If the function performance is to be delayed, block 244, the programmed function is stored in memory 8, block 246 of FIG. 13d, until a predetermined triggering event occurs, block 248, like the computer is connected to a printer. If the function performance is to be done immediately, block 250, or the trigger event of block 248 occurs, the programmed function is performed and any relevant resulting data is displayed on the display screen 14, block 252.

If the user then desires to perform any other operation with the instance, block 254, that function is performed in block 156, such as returning to block 248 to determine if the trigger event has occurred. In addition, if the user wants to move an instance's position on a page or remove an instance from a page, the user could now perform that operation. The user could also select the instance or any other instance in order to change the attributes of that instance, or the user could perform a find operation to locate an instance and its associated data, etc. When the user has finished performing all other operations with the instance, the process is ended, block 258, until the well 16 is again accessed for another instance.

Figure 13B:
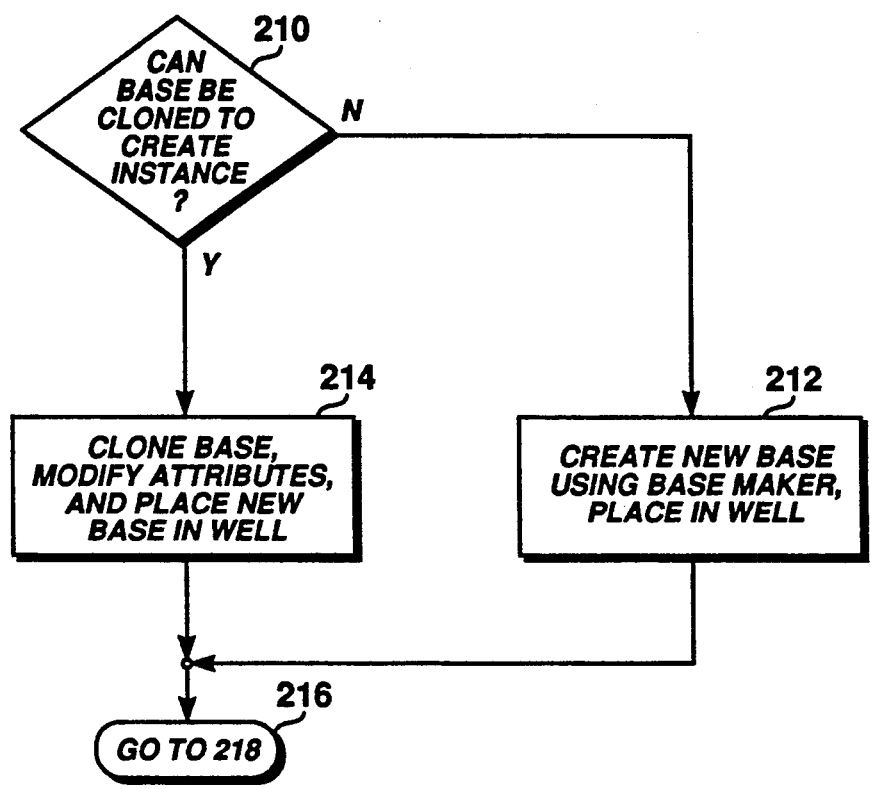
Figure 13C:
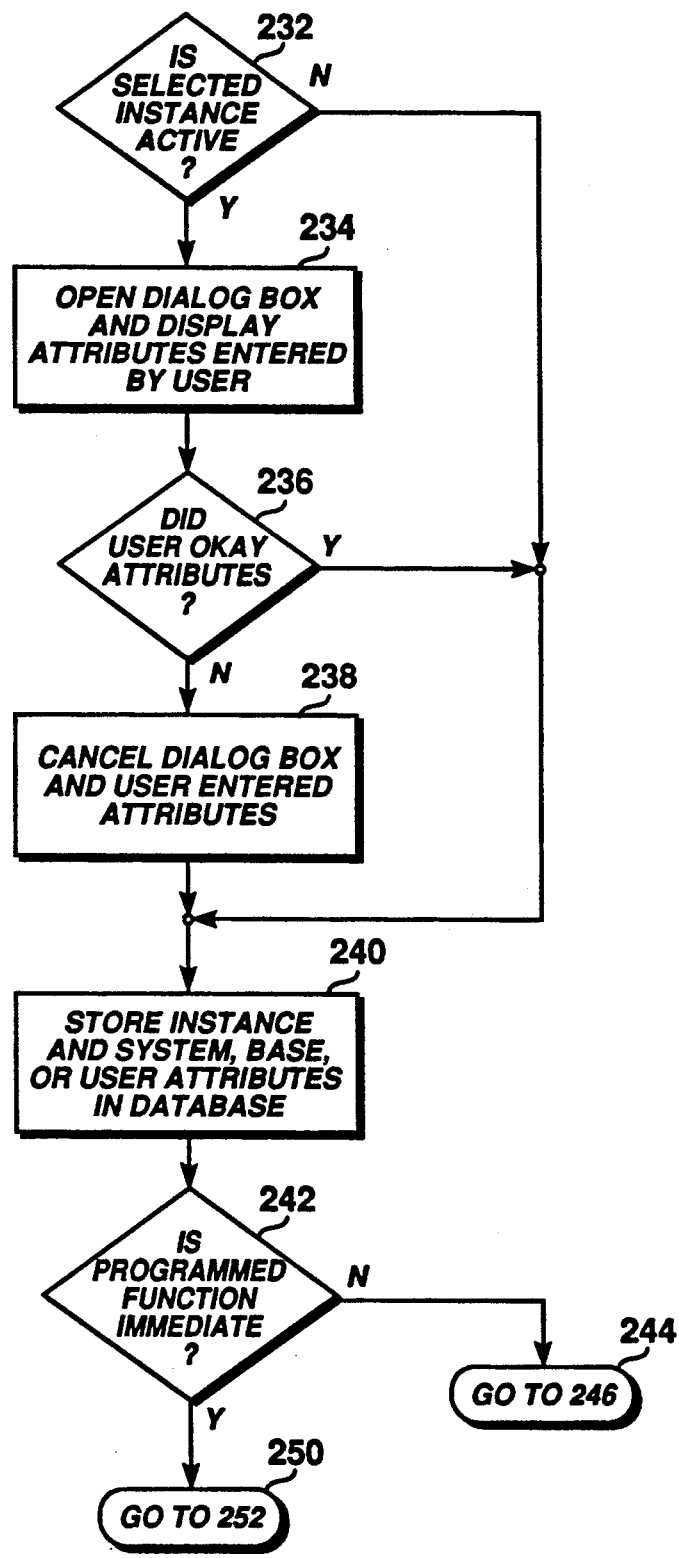
Figure 13D:
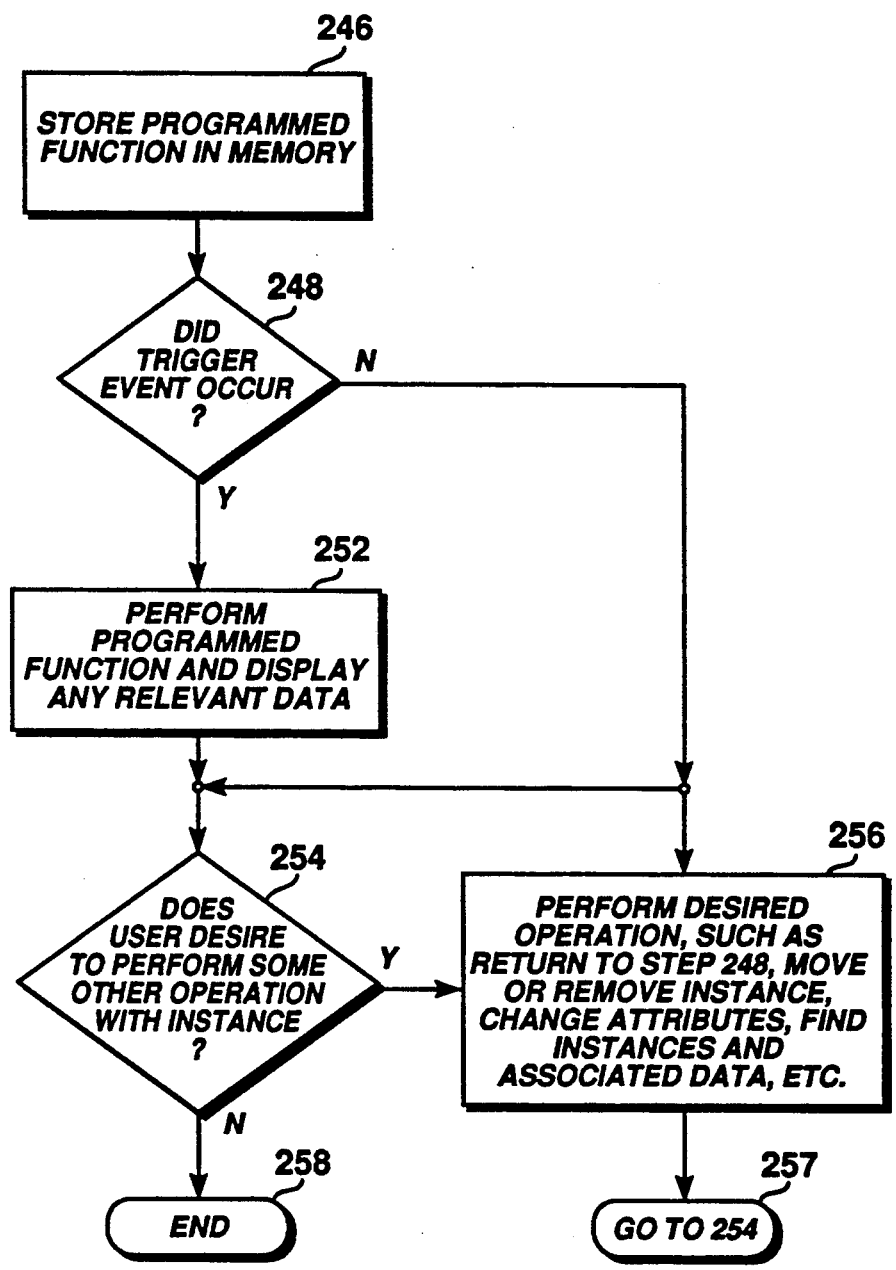
Figure 14A:
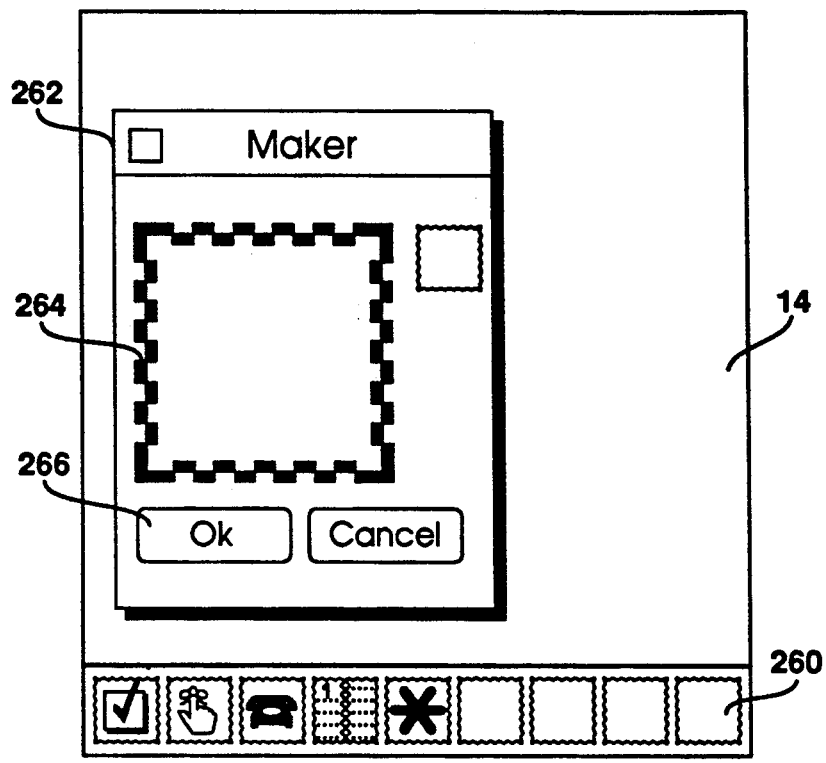
FIG. 14a illustrates the operation of a blank element and an element maker dialog box generated by activation of a blank element.

As described in FIG. 13b, the user can create a new base using the base maker element base 260 of FIG. 14a, which appears as a blank element base. When an instance of base 260 is marked on a page, dialog box 262 is opened on the display screen 14. The user could then draw an image within the base maker box 264 to create the desired appearance of the base 260 and its derived instances. Once the user has decided on the image to be displayed by the new base 260, the user would press the ok button 266, which would then cause a blank script window, now shown, to be opened on the display screen 14, within which the user could write a program script for controlling the function of base 260. If the user didn't want to write an entirely new program or simply wanted to change the image used for another base, the user could simply copy the program from another base and paste it within the script window for base 260. Naturally, if computer 2 had no means for entering or editing text, it would be most difficult for the user to create new scripts without importing them from a preprogrammed floppy disk, memory card, or data connection with another computer. However, if the script lines that the user would want to use are fairly common ones, the user could open a list of premade possible script lines and copy and paste script lines from the list into the open script window. If the user could enter and/or edit text, the user could naturally write her own scripts in the open script window. Although a new scripting language which is totally appropriate for the type of computer with which the elements are being used would be preferred, the elements of the present invention can be programmed using a program language such as the HyperTalk language mentioned above.

Figure 14B:
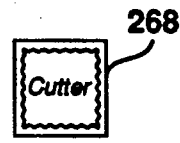

An alternative embodiment to the technique of using base 260 to enclose data within a framing box to create an image for display by the new base is shown in FIG. 14b, which illustrates the cutter element base 268. To use the cutter base 268, the user would select base 268 from the well 16 to create an instance of the base 268. The user would then move the instance around the page on the display screen until the instance was centered over an image from the page that the user wanted to use to create the image for the new base, at which point the user would drop the instance on the page, thereby causing the image over which it was centered to be copied and pasted into the new base and its instance for display. To make this process easier on the user, the user would be able to see through the empty instance of the element cutter base 268 to see the page underneath until the instance was dropped on the page.

Figure 14C:
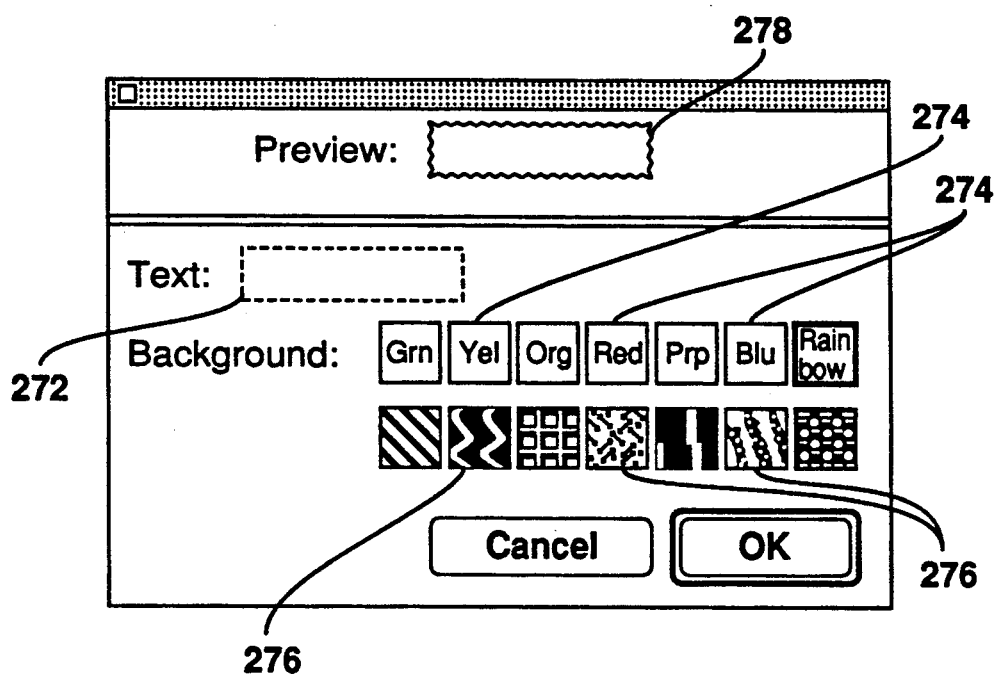

FIG. 14c illustrates a modified version of the base maker dialog box 264 of FIG. 14a. In base maker dialog box 270, the user has the option of writing her own text and selecting various background colors and/or patterns for display in the new base and its instance instead of an image from the page. The user would first write whatever message the user wanted to in the text box 272, and then select one of the background colors from amongst color buttons 274 and/or one of the patterns from amongst pattern buttons 276. The newly created image could then be previewed in preview box 278.

Figure 15A:
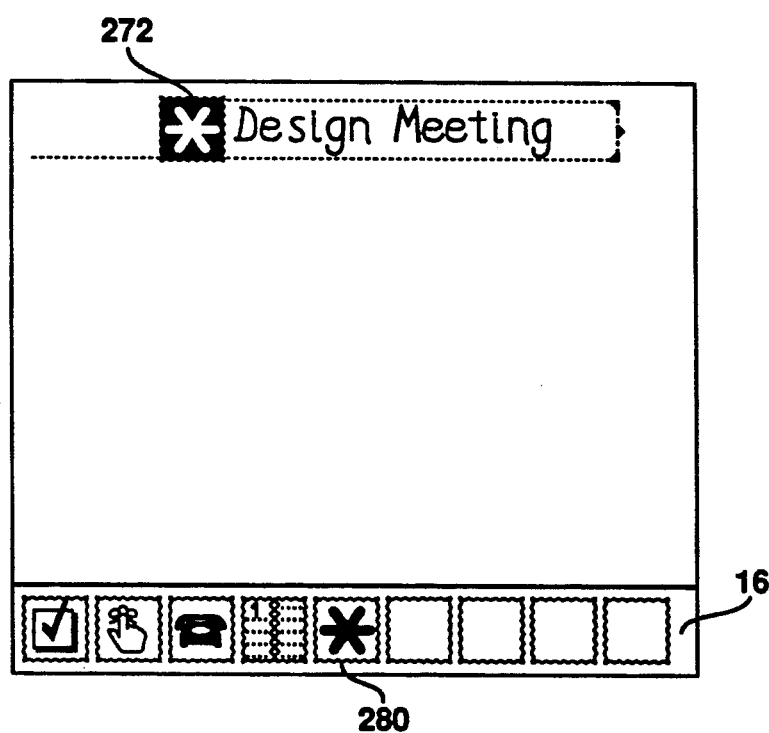
FIG. 15a illustrates the operation of a meeting element.

The operation of another type of element, the compound element, is demonstrated by the meeting element base 280 and its instance 272 of FIG. 15a. To use the meeting element, the user would first mark the page of display screen 14 with instance 282 and enclose any desired data, such as the words "Design Meeting".

Figure 15B:
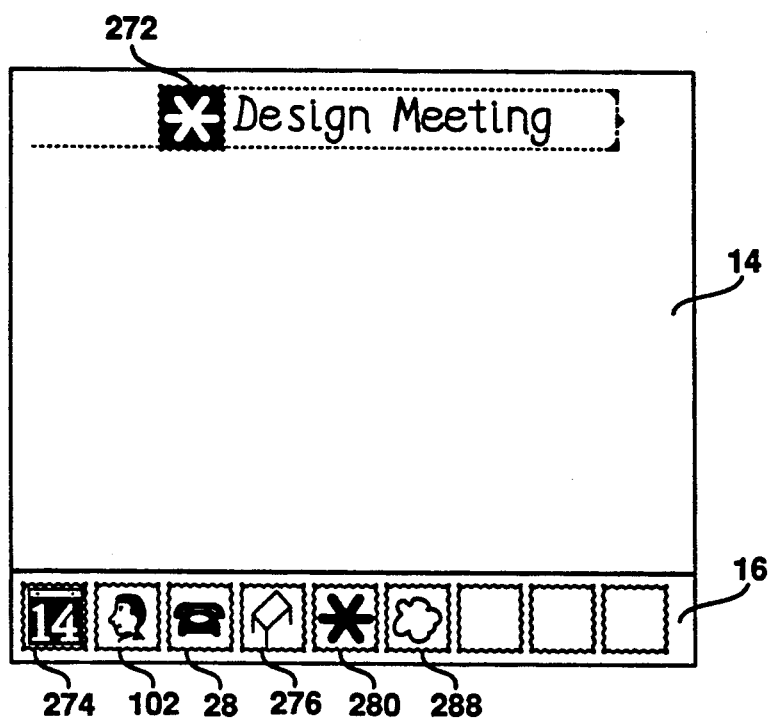
FIG. 15b further illustrates the operation of the meeting element of FIG. 15a and a technique for compounding a series of user interface elements together to perform more complex functions than could normally be carried out by a single user interface element.
Figures 15C, 15D:
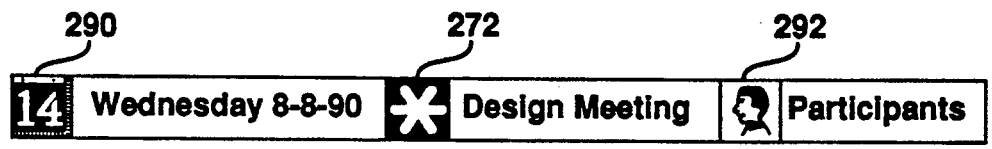

After releasing instance 272, the set of element bases in well 16 of FIG. 15a would be replaced by a new set of element bases, illustrated in FIG. 15b, which are each somehow related to instance 272. For example, since instance 272 relates to a meeting, the new set of element bases all relate to a meeting as well. These element bases include calendar element 284, participants element 102, phone element 32, conference room element 286, another meeting element 280, and thought element 288. Each of these new elements, such as calendar instance 290 and participants instance 292 of FIG. 15c, can then be selected from the well 16 and placed on either side of the instance 272 to create a compound element, of which instance 272 forms the primary instance. Each of the instances compounded to the primary instance can then have their attributes entered as desired, such as the names of various participants selected from the dialog box 294 of FIG. 15d for participants element instance 292.

When the user has entered the attributes for the compounded instances, all of the instances but the primary instances are hidden from view until the next time the primary instance is selected, thereby allowing the user to perform more operations and store more information within the area of the display normally occupied by a single instance. In addition, when the performance of the function of a primary instance is triggered, the other instances compounded to the primary instance perform their functions as well in a hierarchical order.

Although the present invention has been described with reference to FIGS. 1-15 and with emphasis on a particular embodiment, it should be understood that the figures are for illustration only and should not be taken as limitations upon the invention. It is contemplated that many changes and modifications may be made by one of ordinary skill in the art to the elements, process and arrangement of steps of the process of the invention without departing from the spirit and scope of the invention as disclosed above.

We claim:

1. A user interface system for use in a computerized system having a processor, a memory, a display and an interactive input/output system in communication with the processor, the memory and the display for operating the user interface system, comprising:

a user interface element including means for identifying said user interface element to a user, and means for marking data displayed within one or more documents on said display with said identifying means in such a manner that said marked data can be subsequently found, organized and processed by said computerized system through utilization of said identifying means;

means for storing one or more of said identifying means for one or more user interface elements in said memory as a proxy to said marked data;

means for finding said marked data in said memory by searching for said proxy in said memory;

means for organizing said marked data in accordance with predetermined organizing commands corresponding to said identifying means;

means for processing said marked data in accordance with predetermined processing commands corresponding to said identifying means; and means for displaying said marked data on said display.

2. A user interface system as recited in claim 1, said user interface system further comprising means for programming said user interface element to create said predetermined organizing commands and to create said predetermined processing commands so as to control performance of one or more operations related to said marked data by said computerized system, said identifying means being operative to uniquely relate said user interface element to one or more of said operations.

3. A user interface system as recited in claim 2, wherein one of said operations is automatically performed by said computerized system after said data is marked with said user interface element.

4. A user interface system as recited in claim 2, wherein performance of a portion or all of one of said operations is delayed by said computerized system until initiated by said user through said interactive input/output system.

5. A user interface system as recited in claim 2, wherein performance of a portion or all of one of said operations is delayed by said computerized system until occurrence of a predetermined trigger event.

6. A user interface system as recited in claim 1, wherein said marking means includes means for selecting said marked data to associate said marked data with said user interface element.

7. A user interface system as recited in claim 6, wherein said identifying means includes a visual representation of said user interface element, and wherein said selecting means includes a framing box which is issued from said representation as said representation is moved across said display by said user through use of said interactive input/output system.

8. A user interface system as recited in claim 6, wherein said storing means is further operative to store said marked data in said memory in association with said proxy.

9. A user interface system as recited in claim 1, wherein said identifying means includes a visual representation of said user interface element.

10. A user interface system as recited in claim 1, wherein said identifying means includes an aural representation of said user interface element.

11. A user interface system as recited in claim 1, wherein said user interface system further comprising a plurality of user interface elements, at least two of said user interface elements having common identifying means and at least one of said user interface elements having different identifying means, wherein said organizing means includes means for compiling a list of marked data corresponding to said common identifying means, and wherein said display means includes means for displaying said list together with said common identifying means on said display.

12. A user interface system as recited in claim 11, said organizing means further comprising means for cataloging said marked data on said list.

13. A user interface system as recited in claim 1, wherein said user interface element further includes a base and an instance, said user interface system and said base being operative to impart common attributes to said instance, said instance being derived from said base and being operative to have different attributes created by said user.

14. A user interface system as recited in claim 13, wherein said identifying means for said base and said instance are identical when said instance is first derived from said base.

15. A user interface system as recited in claim 14, said user interface system further comprising means for programming said user interface element to create said predetermined organizing commands and to create said predetermined processing commands so as to control performance of one or more operations related to said marked data by said computerized system, wherein said identifying means is operative to uniquely relate said user interface element to said operations, and wherein said identifying means for said instance is modified subsequent to its derivation from said base to indicate a change in status of an operation.

16. A user interface system as recited in claim 15, wherein said identifying means for said instance is automatically modified by said user interface system upon completion of at least one predetermined portion of one of said operations by said computerized system.

17. A user interface system as recited in claim 13, wherein said identifying means for said instance is modified by said user subsequent to its derivation from said base.

18. A user interface system as recited in claim 1, wherein said displaying means includes means for displaying a document in such a manner so as to highlight said marked data and said identifying means within said document after finding said marked data.

19. A user interface system as recited in claim 1, said user interface system further comprising means for programming said user interface element to create said predetermined organizing commands and to create said predetermined processing commands so as to control performance of one or more operations related to said marked data by said computerized system, said identifying means being operative to uniquely relate said user interface element to said operations, said user interface system further comprising a plurality of user interface elements, at least two of said user interface elements having common identifying means and at least one of said user interface elements having different identifying means, said user interface elements having common identifying means corresponding to a common type of operation to be performed by said computerized system, said user interface elements having a different identifying means corresponding to a different type of operation to be performed by said computerized system.

20. A user interface system as recited in claim 19, wherein said user interface elements are operative to be compounded together in such a manner that performance of an operation by a first user interface element causes performance of an operation by a second user interface element.

* * * * *